(12) United States Patent
Peters et al.

(10) Patent No.: US 10,759,087 B2
(45) Date of Patent: Sep. 1, 2020

(54) MORTAR DELIVERY SYSTEM

(71) Applicant: Construction Robotics, LLC, Victor, NY (US)

(72) Inventors: Scott Lawrence Peters, Pittsford, NY (US); Timothy Riley Voorheis, Rochester, NY (US); Michael John Oklevitch, Lima, NY (US); Rockwell Najeeb Yarid, Rochester, NY (US); Kerry Evan Lipp, Prattsburgh, NY (US); Erwin Ludwig Allmann, Penfield, NY (US)

(73) Assignee: Construction Robotics, LLC, Victor, NY (US)

( * ) Notice: Subject to any disclaimer, the term of this patent is extended or adjusted under 35 U.S.C. 154(b) by 682 days.

(21) Appl. No.: 15/308,358

(22) PCT Filed: May 1, 2015

(86) PCT No.: PCT/US2015/028686
§ 371 (c)(1),
(2) Date: Nov. 1, 2016

(87) PCT Pub. No.: WO2015/168490
PCT Pub. Date: Nov. 5, 2015

(65) Prior Publication Data
US 2017/0066157 A1 Mar. 9, 2017

Related U.S. Application Data

(60) Provisional application No. 61/987,978, filed on May 2, 2014.

(51) Int. Cl.
*B28C 5/00* (2006.01)
*B01F 15/00* (2006.01)
(Continued)

(52) U.S. Cl.
CPC ........ *B28C 5/1253* (2013.01); *B01F 7/00441* (2013.01); *B01F 7/086* (2013.01);
(Continued)

(58) Field of Classification Search
CPC .................. B01F 7/00441; B01F 7/086; B01F 2215/0047; B01F 7/088; B01F 15/00162;
(Continued)

(56) References Cited

U.S. PATENT DOCUMENTS 3,310,293 A 3/1967 Zimmerman
4,117,547 A 9/1978 Mathis et al.
(Continued)

FOREIGN PATENT DOCUMENTS

JP 10148033 11/1996

*Primary Examiner* — Anshu Bhatia
(74) *Attorney, Agent, or Firm* — Patent Technologies, LLC; Robert D. Gunderman, Jr.

(57) ABSTRACT

A Mortar Delivery System is described. The Mortar Delivery System provides precise control of the delivery and application of mortar in addition to the mixing and tempering of mortar. Such control eliminates the use of a hand trowel in brick, block and stone laying applications. Sensing and control are integrated with the Mortar Delivery System to make it an important element of a robotic brick laying system. The Mortar Delivery System contains sensors to measure mortar viscosity and workability, mortar flow rate, and mortar nozzle pressure. The data from the Mortar Delivery System sensors can be used to change the rotational speed of the shear blades, change the amount of water being used for mixing or tempering, and change the delivery speed of the mortar. Such changes result in precise control of mortar that is in turn suitable for automated or semi-automated building processes.

22 Claims, 24 Drawing Sheets

(51) Int. Cl.
  *B28C 5/12*    (2006.01)
  *B28C 7/02*    (2006.01)
  *B01F 15/02*   (2006.01)
  *B01F 7/00*    (2006.01)
  *E04G 21/20*   (2006.01)
  *B01F 7/08*    (2006.01)
  *C04B 41/65*   (2006.01)
  *C04B 111/00*  (2006.01)

(52) U.S. Cl.
  CPC ........ *B01F 7/088* (2013.01); *B01F 15/00162* (2013.01); *B01F 15/00201* (2013.01); *B01F 15/00207* (2013.01); *B01F 15/00389* (2013.01); *B01F 15/0235* (2013.01); *B01F 15/0289* (2013.01); *B28C 5/1292* (2013.01); *B28C 7/024* (2013.01); *B28C 7/026* (2013.01); *C04B 41/65* (2013.01); *E04G 21/202* (2013.01); *B01F 2215/0047* (2013.01); *C04B 2111/00646* (2013.01)

(58) Field of Classification Search
  CPC ......... B01F 15/00201; B01F 15/00207; B01F 15/00389; B01F 15/0235; B01F 15/0289; B28C 5/1253; B28C 5/1292; B28C 7/024; B28C 7/026; C04B 41/65; C04B 2111/00646; E04G 21/202
  See application file for complete search history.

(56) References Cited

U.S. PATENT DOCUMENTS

| | | | |
|---|---|---|---|
| 4,492,478 A | | 1/1985 | Ito et al. |
| 4,576,483 A | | 3/1986 | Mathis et al. |
| 5,352,035 A | | 10/1994 | Macauley et al. |
| 5,427,448 A | | 6/1995 | Macaulay et al. |
| 6,054,103 A | * | 4/2000 | Mandel ............ B01F 7/246 422/208 |
| 6,328,798 B1 | * | 12/2001 | Bostrom ............ B01F 7/022 118/303 |
| 6,370,837 B1 | | 4/2002 | McMahon et al. |
| 7,837,378 B2 | | 11/2010 | Khoshnevis |
| 8,166,727 B2 | | 5/2012 | Pivac et al. |
| 8,657,485 B2 | * | 2/2014 | Neier ............ A01K 5/004 366/297 |
| 2005/0196484 A1 | | 9/2005 | Khoshnevis |
| 2007/0036898 A1 | | 2/2007 | Hill et al. |
| 2009/0123262 A1 | * | 5/2009 | Van Mill ............ B60P 1/42 414/526 |
| 2012/0053726 A1 | | 3/2012 | Peters et al. |

\* cited by examiner

MORTAR DELIVERY SYSTEM

CROSS REFERENCE TO RELATED PATENT APPLICATIONS

This application claims priority to U.S. Patent Application Ser. No. 61/987,978 filed May 2, 2014 entitled "Mortar Delivery System" by Peters et al., and to international Application Number PCT/US2015/028686 filed May 1, 2015, the entire disclosures of which are incorporated herein by reference in their entirety

BACKGROUND OF THE INVENTION

1. Field of the Invention

The present invention relates generally to construction equipment, and more particularly to a Mortar Delivery System for accurate and precise mortar delivery for applications such as automating or semi-automating masonry construction.

2. Description of Related Art

In masonry construction, mortar is frequently used to hold together building elements such as blocks, stone, bricks, and the like. Mortar for construction is commonly a workable paste made from a mixture of Portland cement, lime and sand. Mortar is applied to building elements with a trowel or similar tool and spread to create a bonding surface, allowing one building element to bond to another. Mortar is also applied between building elements as a grout to both create aesthetically pleasing lines and to tighten up the bond spaces between building elements. In recent years, a variety of mortar additives have become popular to reduce the tendency of mortar to shrink crack, or move. Additives also provide structural benefits such as reduced brittleness, flexibility, and resiliency. Additives such as polymeric admixtures are added to traditional cement mortars or replace components of traditional cement mortars to achieve improved or modified performance. Mortar, as used herein, includes grout, concrete, adhesives, plaster, or any other product that is applied in a wet or semi-liquid form and hardens.

While masonry construction is commonly performed manually, with mortar being spread by means of a hand trowel, there have been recent advances in automation to reduce some of the manual labor involved in brick, block and stone wall construction. Mortar Delivery Systems to move mortar into joints for grouting applications have grown in popularity for larger jobs. Recently, a Robotic Brick Laying System has been described in U.S. Pat. No. 8,965,571 to Peters et al., the entire disclosure of which is incorporated herein by reference as permissible by national or regional laws. To facilitate such a system, an automated means to spread mortar on a building element such as a brick or a block is needed. In addition, precise process measurement and control is needed to ensure proper adhesion of the mortar, proper flow rate of the mortar, proper dispensing quantity, proper mortar rheology, and the like. The ability to properly mix mortar at precisely the right rheology and move the mortar through a dispensing nozzle at the proper flow rate while continuously monitoring and correcting rheology and flow rate is of tremendous importance in the automation or semi-automation of masonry work such as that performed by the Robotic Brick Laying System of Peters et al.

It is thus an object of the present invention to provide a Mortar Delivery System that mixes, tempers, amends and blends mortar on an as needed basis. It is another object of the present invention to provide a Mortar Delivery System that moves mortar through a dispensing nozzle for automation or semi-automation of masonry construction. It is yet another object of the present invention to provide a Mortar Delivery System that monitors mortar rheology and allows in-process adjustments to be made. It is still another object of the present invention to provide a Mortar Delivery System that adjusts mortar application pressure and flow rate to provide optimal mortar adhesion. It is another object of the present invention to provide a Mortar Delivery System that provides optimal core penetration of the mortar in brick laying operations. It is still another object of the present invention to provide a Mortar Delivery System that precisely mixes and/or meters mortar. These and other objects of the present invention are not to be considered comprehensive or exhaustive, but rather, exemplary of objects that may be ascertained after reading this specification with the accompanying drawings and claim.

BRIEF SUMMARY OF THE INVENTION

In accordance with the present invention, there is provided a Mortar Delivery System comprising a hopper in material communication with a mixing structure; a feed auger in material communication with the mixing structure; a feed tube containing the feed auger; a nozzle coupled to the feed tube for forming a mortar bed; a first source of rotational energy mechanically coupled to the mixing structure; a second source of rotational energy mechanically coupled to the feed auger; and a force sensor to measure mortar flow rate and rheology.

The foregoing paragraph has been provided by way of introduction, and is not intended to limit the scope of the invention as described by this specification, claims and the attached drawings.

BRIEF DESCRIPTION OF THE DRAWINGS

The invention will be described by reference to the following drawings, in which like numerals refer to like elements, and in which.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification, claims, and drawings attached hereto.

DESCRIPTION OF THE PREFERRED EMBODIMENTS

The Mortar Delivery System of the present invention provides precise control of the delivery and application of mortar in addition to the mixing and tempering of mortar. This also allows for precise starting and stopping of the mortar delivery system without disturbance of mortar flow, clogging, or other maladies. Such control eliminates the use of a hand trowel in brick block and stone laying applications. Sensing and control are integrated with the Mortar Delivery System to make it an important element of a robotic brick laying system. An example of such a robotic brick laying system is described in U.S. Pat. No. 8,965,371 to Peters et al., the entire disclosure of which is incorporated herein by reference as permissible by national or regional laws.

Turning now to the drawings, detailed views of the Mortar Delivery System can be seen. It should be noted that the drawings and specification describe the Mortar Delivery System in use with a robotic brick laying system as an example, and not a limitation, of the present invention. After a review of this specification, claims and drawings, one can appreciate that the applications of such a Mortar Delivery System are numerous and are not limited to robotic brick laying. Further, several embodiments of the Mortar Delivery System are presented herein as examples, and not limitations. Many of the components and their related descriptions are common between the embodiments described herein, and are to be considered applicable and interchangeable between the embodiments described and envisioned herein.

Figure 1:
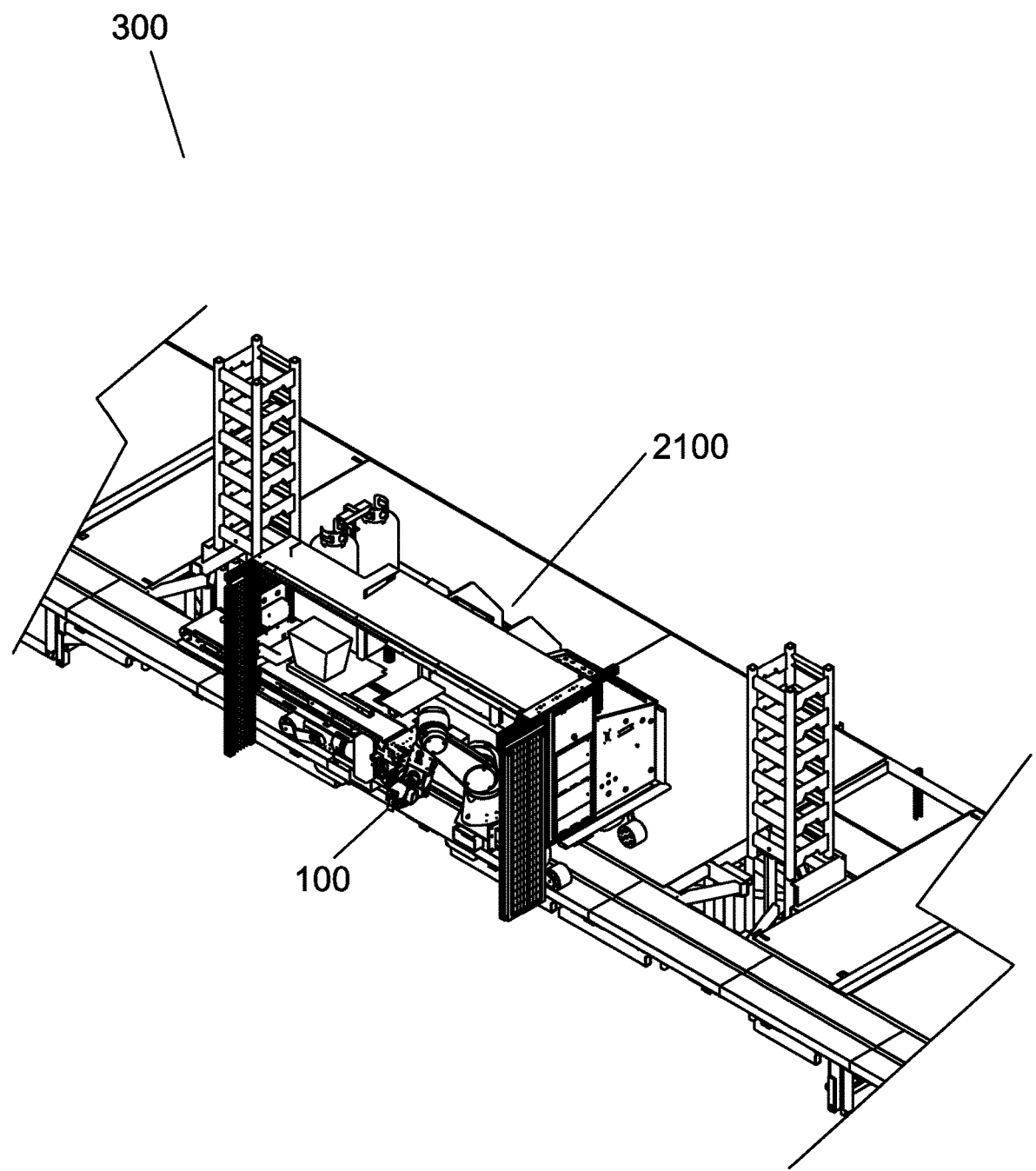
FIG. 1 is a perspective view of a brick laying system.

In FIG. 1, a perspective view of a brick laying system 300 can be seen. In such a system, a robotic arm assembly 100 moves and places bricks, blocks, stones, or other building elements. In the process of picking up and placing a building element during construction of a wall, building, or the like, it is common for mortar to be applied to the building element. With the present invention, a Mortar Delivery System 2100 or 200 is employed to deliver an accurate quantity and pattern of mortar on each building element. The characteristics of the mortar can be changed for each building application, or to make adjustments for temperature, humidity, work environment, dwell time of the mortar, skill of the user, properties of the building element, and the like. These mortar characteristics include mortar rheology, and can be adjusted through a series of sensors and process control parameters that are part of the Mortar Delivery System, and will be further described herein. As described herein, the Mortar Delivery System of the present invention is depicted as a fixed device where the building element is moved under the mortar dispensing nozzle for application of mortar. One can equally envision that the Mortar Delivery System, or the nozzle therein, can move in relation to the building element. Such an alternative embodiment being considered within the spirit and broad scope of the present invention as described herein.

Figure 2:
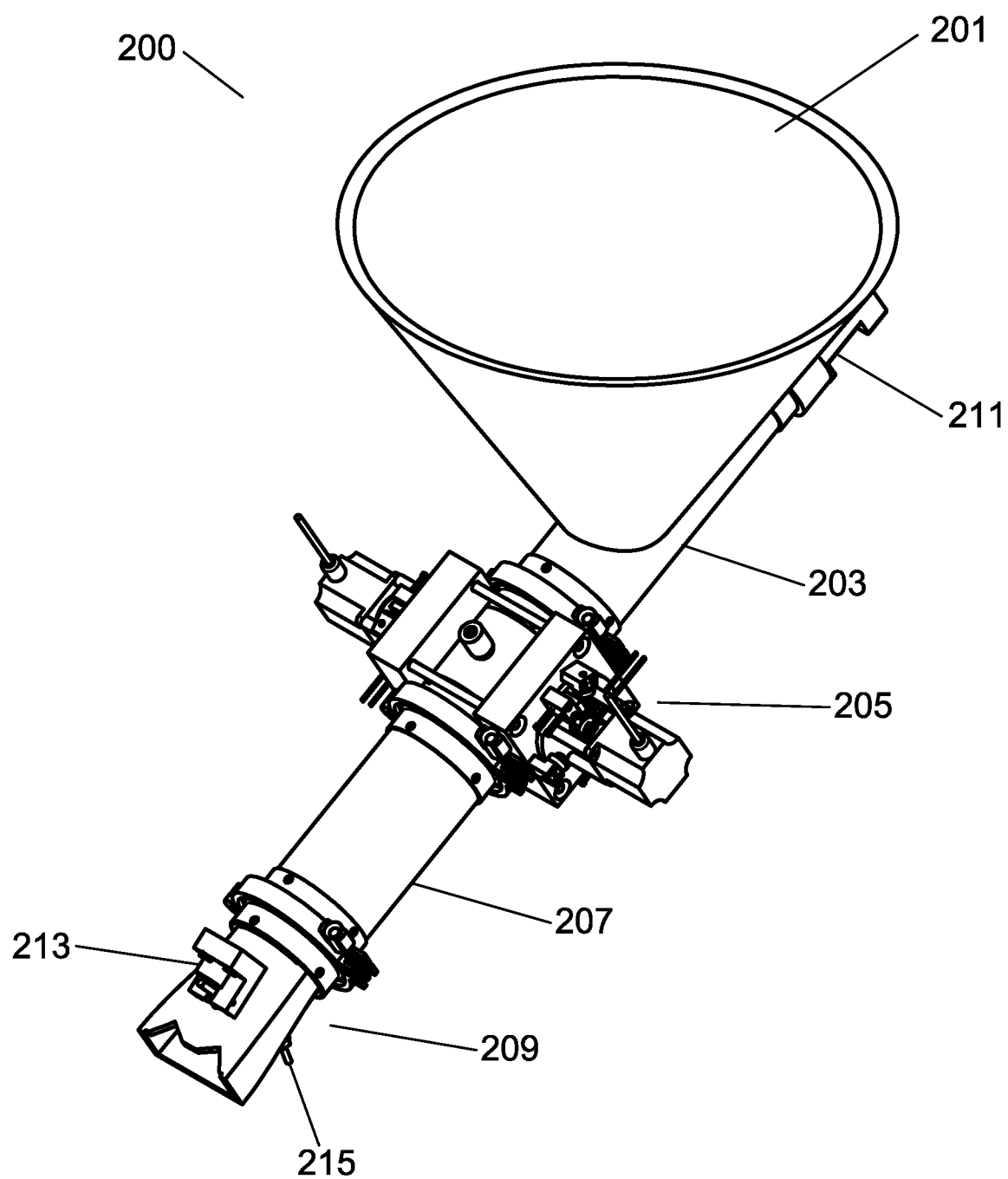
FIG. 2 is a top perspective view of the Mortar Delivery System.

FIG. 2 is a top perspective view of the Mortar Delivery System of the present invention. The various components of the Mortar Delivery System may be made from a plastic such as polypropylene, polyethylene, polystyrene, or from a metal such as steel, stainless steel, brass, copper, or the like. As used herein, the Mortar Delivery System comprises a feed zone, a conditioning zone, and a metering zone. The feed zone provides for delivery of mortar or mortar mix to the conditioning and metering zones. In some embodiments of the present invention, zones may overlap. The feed zone may include, in some embodiments of the present invention, a first feed tube with an auger to move the mortar. A pump or similar device may also be employed in place of the auger to move mortar or mortar mix. The feed zone may include a hopper or other feeding structure. As the mortar or mortar mix leaves the feed zone and enters the conditioning zone, a conditioning device in the conditioning zone provides for mixing of the mortar or mortar mix to make it homogenous, tempering of the mortar to change the viscosity and workability of the mortar by breaking it up, and amending of the mortar by adding water to change the viscosity and workability of the mortar.

The metering zone comprises a feed tube for the delivery of mortar. The nozzle is in turn coupled to a feed tube that serves as a conduit or passageway for the mortar to travel.

As part of the feed zone, a hopper 201 can be seen in FIG. 2 that may be generally conical in shape or otherwise tapered or formed to facilitate the entry of mortar or mortar mix into the Mortar Delivery System. The hopper is coupled to a first feed tube 203 that may be generally cylindrical in shape or otherwise formed, and contains a first auger such as a feed auger (not seen in FIG. 2, see FIG. 5). The hopper may, in some embodiments of the present invention, contain a vibratory element such as a motor with an offset weighted shaft to assist with proper feed of material though the hopper. In some embodiments of the present invention, a pressure sensor may be placed in the first feed tube 203 to allow for the measurement of pressure at the first feed tube and in conjunction with another pressure sensor downstream to measure flow and/or application pressure. In some embodiments of the present invention, other in-line flow sensors can be added to the system. A conditioning device 205 can be seen coupled to the first feed tube 203 and in fluid communication thereof. Fluid communication, as described herein, includes the flow of powder or fine material such as mortar mix, fine aggregate, polymer additives, water, fibers, and the like, as well as the flow of fluid or a slurry, paste, semi-liquid or semi-solid, including mortar. The conditioning device 205 will be described further in this specification, as mixing of mortar, tempering of mortar, and variation of mortar rheology, as well as sensing and control, can take place in the conditioning device 205. The conditioning device 205, as will be seen in subsequent drawings, contains a blade or blades coupled to motors as well as sensors. The rotational speed of the blades may be, for example, in one embodiment of the present invention, approximately 107 rotations per minute plus or minus 30 rotations per minute. A second feed tube 207 is in turn coupled to the conditioning device, and is generally cylindrical in shape to facilitate exit of mortar from the conditioning device 205. The second feed tube 207 may also contain an auger (not seen in FIG. 2, see FIG. 5). A nozzle 209 is mechanically coupled to the second feed tube 207 and has a nozzle output pressure sensor 215 to determine mortar application pressure and a flow sensor 213. Both sensors are further described by way of FIGS. 18-20. As evident in FIG. 2, the nozzle 209 may be removed for cleaning, interchanging with other nozzle shapes, and the like. In one embodiment, the nozzle 209 has a double v shaped edge for creation of a two bead mortar bed. Other embodiments of the nozzle include a single v shaped edge, a u channel, a v channel, or other such profiles to increase the tendency of the mortar to adhere to a building element. In some embodiments of the present invention, the nozzle 209 is compliant to increase mortar adhesion. An example of a compliant nozzle 209 is one that contains a compliant material such as, for example, a clear poly-vinyl chloride.

Figure 3:
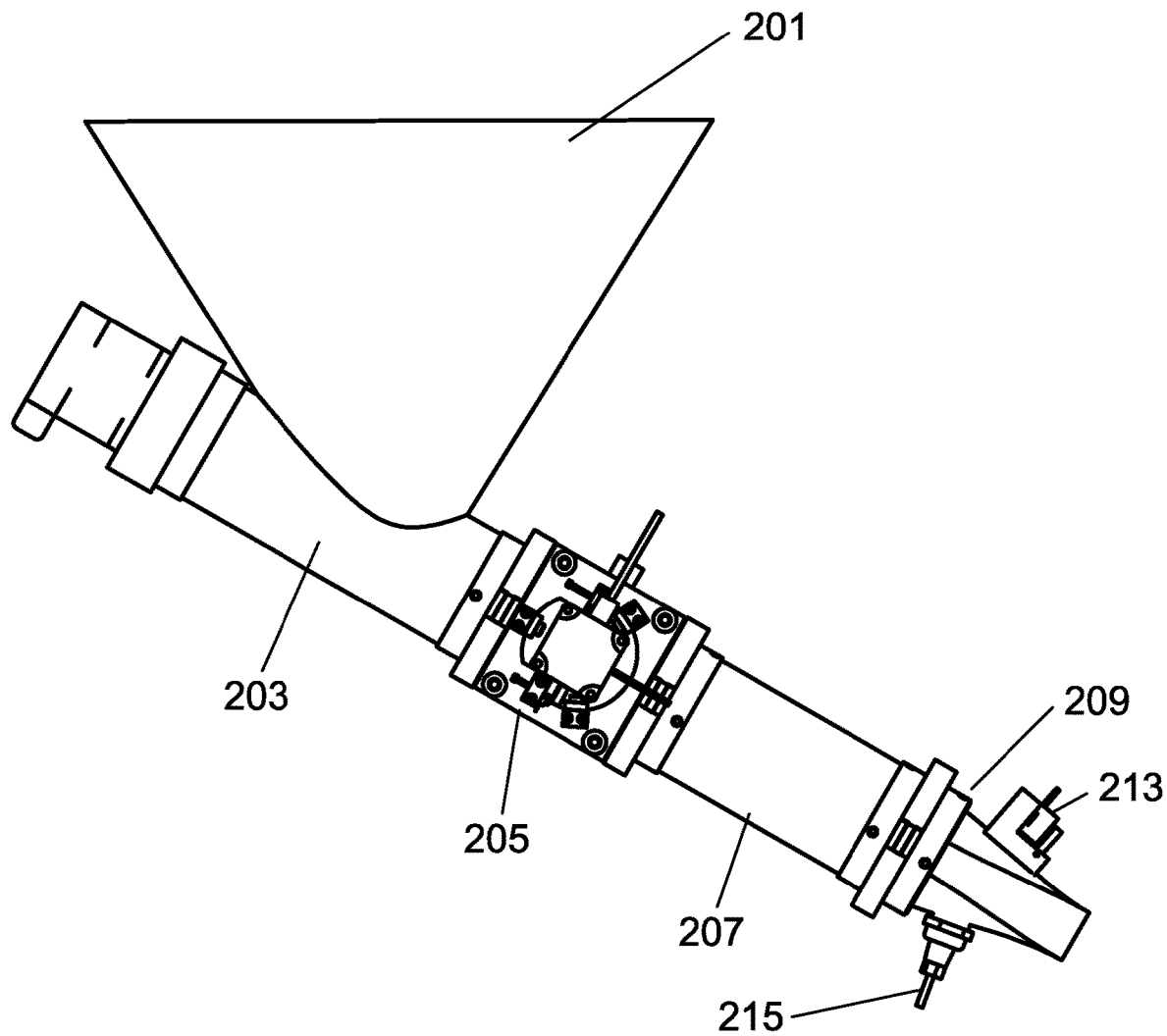
FIG. 3 is a side view of the Mortar Delivery System.
Figure 4:
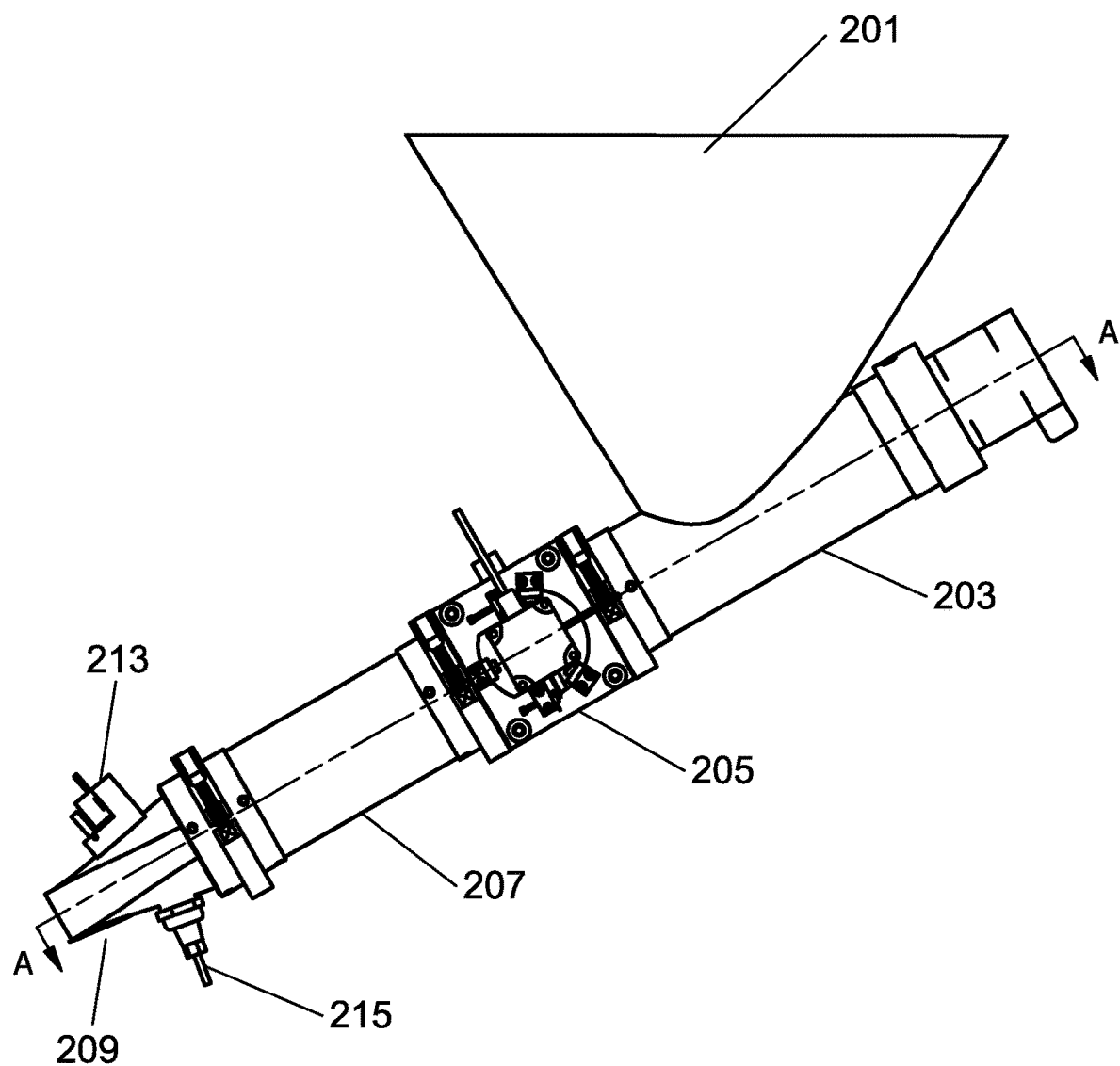
FIG. 4 is an opposing side view of the Mortar Delivery System.

FIG. 3 is a side view of the Mortar Delivery System and FIG. 4 is an opposing side view of the Mortar Delivery System. The angled orientation of the feed tubes in this exemplary embodiment can be seen. Such an angle can vary from zero degrees to 90 degrees, with an example in one embodiment of the present invention being 15-45 degrees. The purpose of the angled orientation is to allow gravity to assist in the flow of mortar or mortar mix in the feed tubes. In some embodiments of the present invention the feed tube may be angled upward, or may change incline. The various elements of the Mortar Delivery System may also contain quick release fixtures to facilitate cleaning and maintenance.

Figure 5:
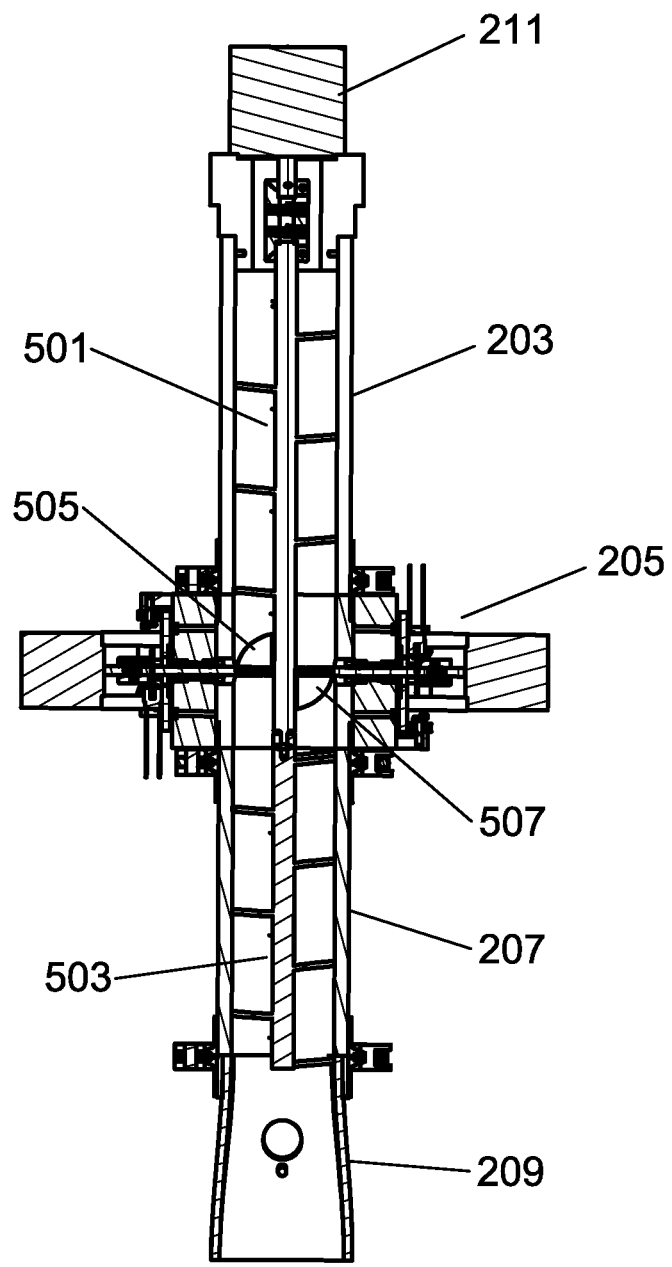
FIG. 5 is a cutaway view of the Mortar Delivery System taken along line A-A of FIG. 4.

FIG. 5 is a cutaway view of the Mortar Delivery System taken along line A-A of FIG. 4. The internal mechanisms responsible for the movement of mortar mix and mortar and the mixing and adjustment of mortar, can be clearly seen. A first auger 501 can be seen within the fit feed tube 203. The first auger 501 has a shaft and a spiral or rotational vein or veins for movement of mortar mix or mortar into the conditioning device. A drive motor assembly 211 can be seen rotationally coupled to the first auger 501. The drive motor assembly 211 may be an electric motor such as a servo motor, permanent magnetic DC motor, or the like. The conditioning device 205 contains a first shear blade 505 and a second shear blade 507. In one embodiment of the present invention, the shear blades are taken as a quadrant of a circle and made from a metal such as stainless steel, or the like. A second auger 503 can be seen within the second feed tube 207. The second auger 503 has a shaft and a spiral or rotational vein or veins for movement of mortar out of the conditioning device 205 and into the nozzle 209. The second auger 503 may be driven from a separate drive motor, or may be coupled to the first auger via a shaft, gears, chains, belts, or the like. The mechanical coupling between the first auger 501 and the second auger 503 passes through the conditioning device 205, and appropriate accommodations are made for the passage of the mechanical coupling, such as a space between the first shear blade 505 and the second shear blade 507, or the like. The second auger 503 and second feed tube 207 make up the pumping zone, and can also employ a variety of pumps including progressive cavity, hose, lobe, or the like, in addition to, or to replace the auger arrangement herein described by way of example. In some embodiments of the present invention, a shear blade or multiple shear blades are attached to a mixing structure.

Figure 6:
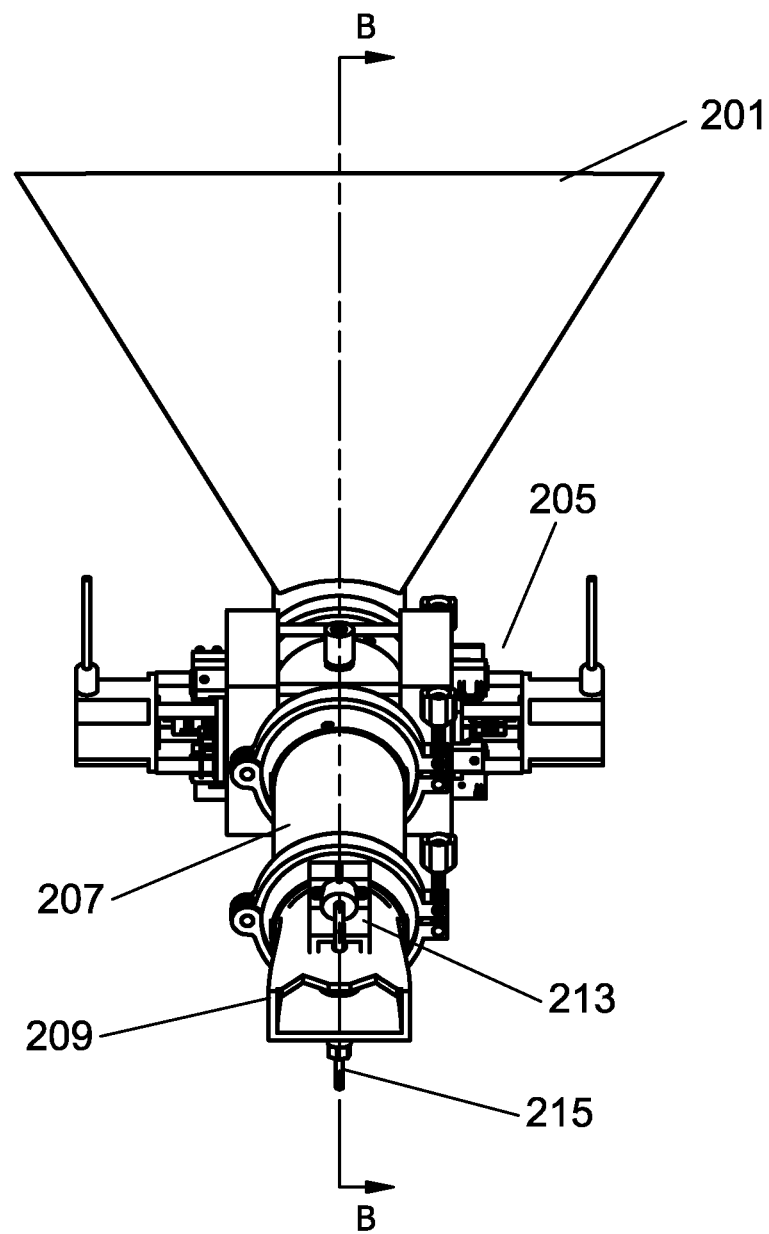
FIG. 6 is a nozzle end perspective view of the Mortar Delivery System of the present invention.
Figure 7:
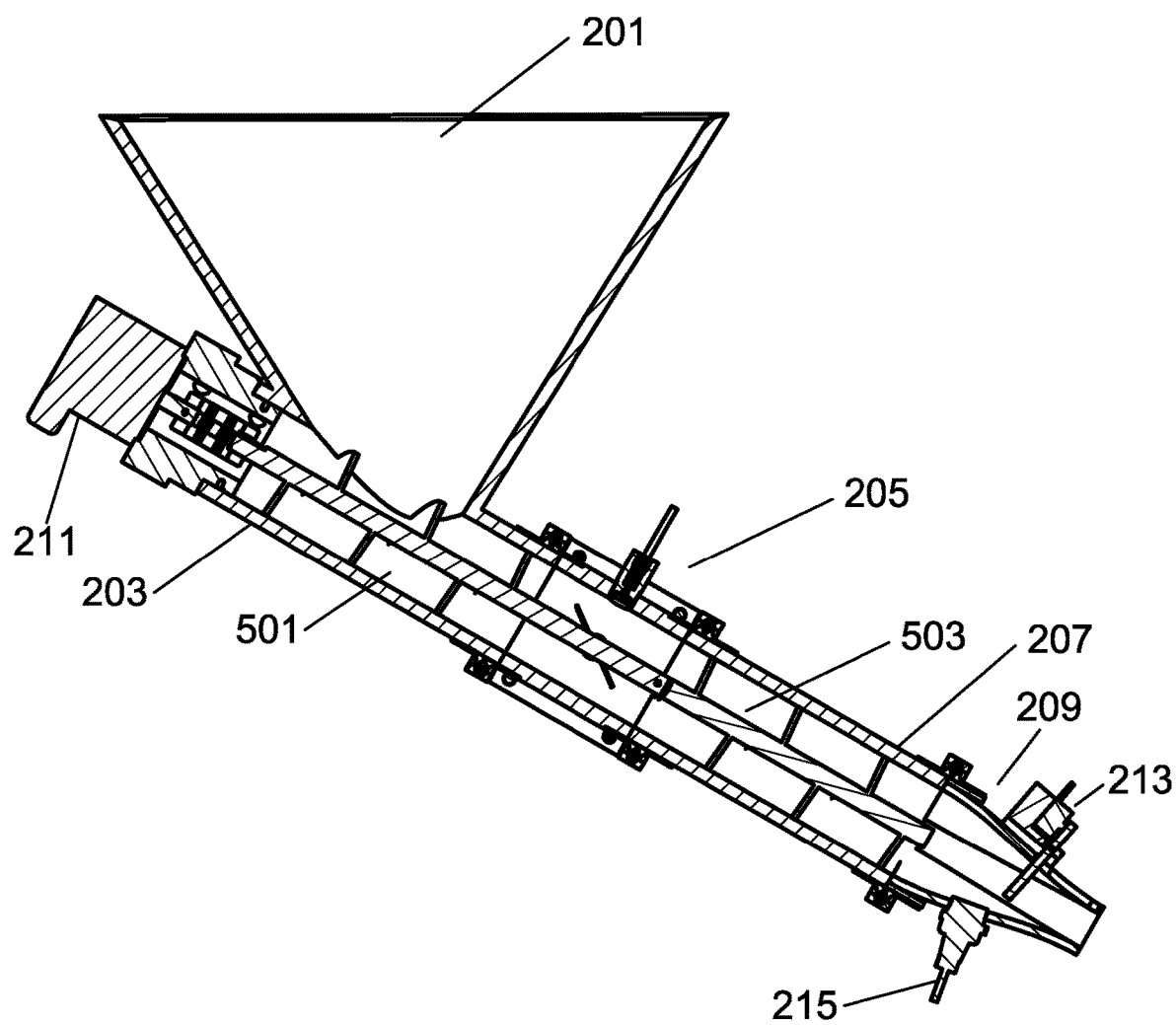
FIG. 7 is a cutaway view of the Mortar Delivery System taken along line B-B of FIG. 6.
Figure 8:
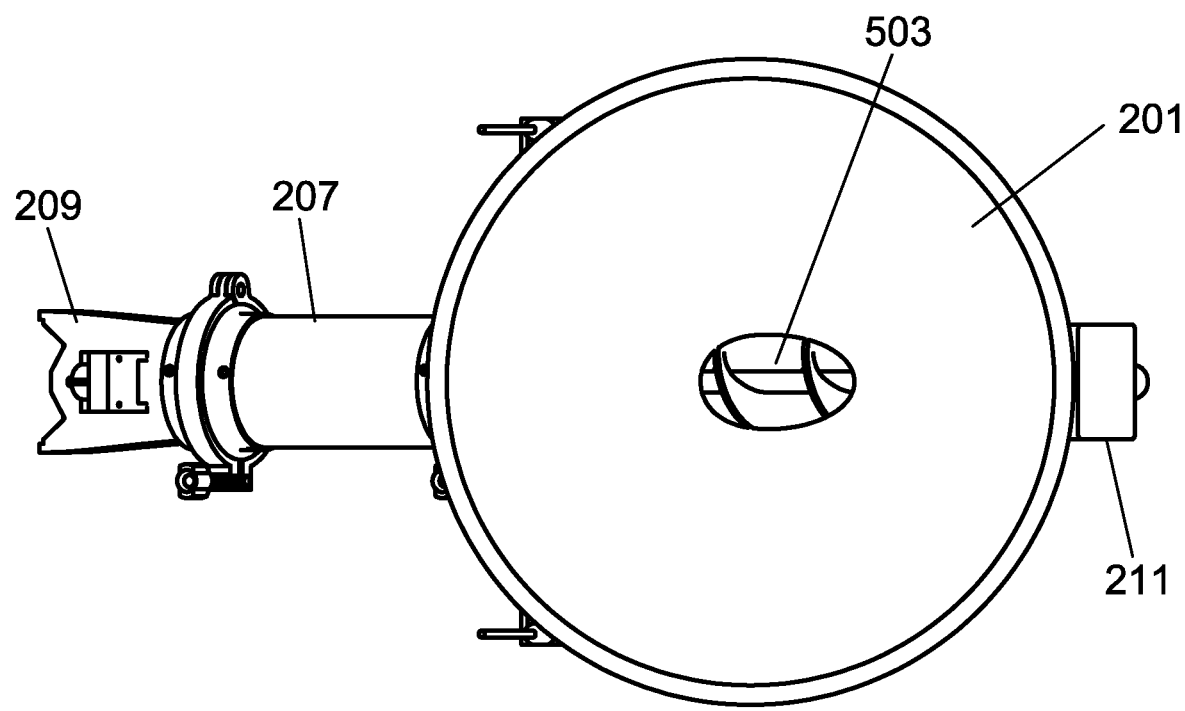
FIG. 8 is a top plan view of the Mortar Delivery System.
Figure 9:
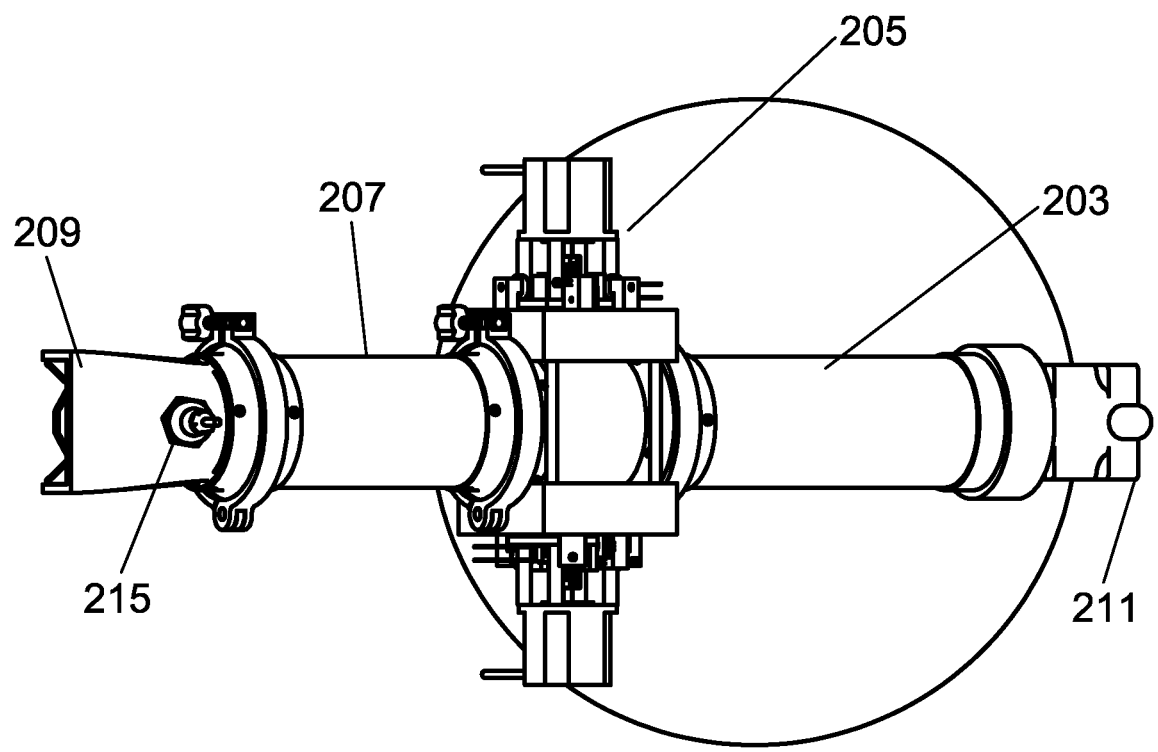
FIG. 9 is a bottom plan view of the Mortar Delivery System.
Figure 10:
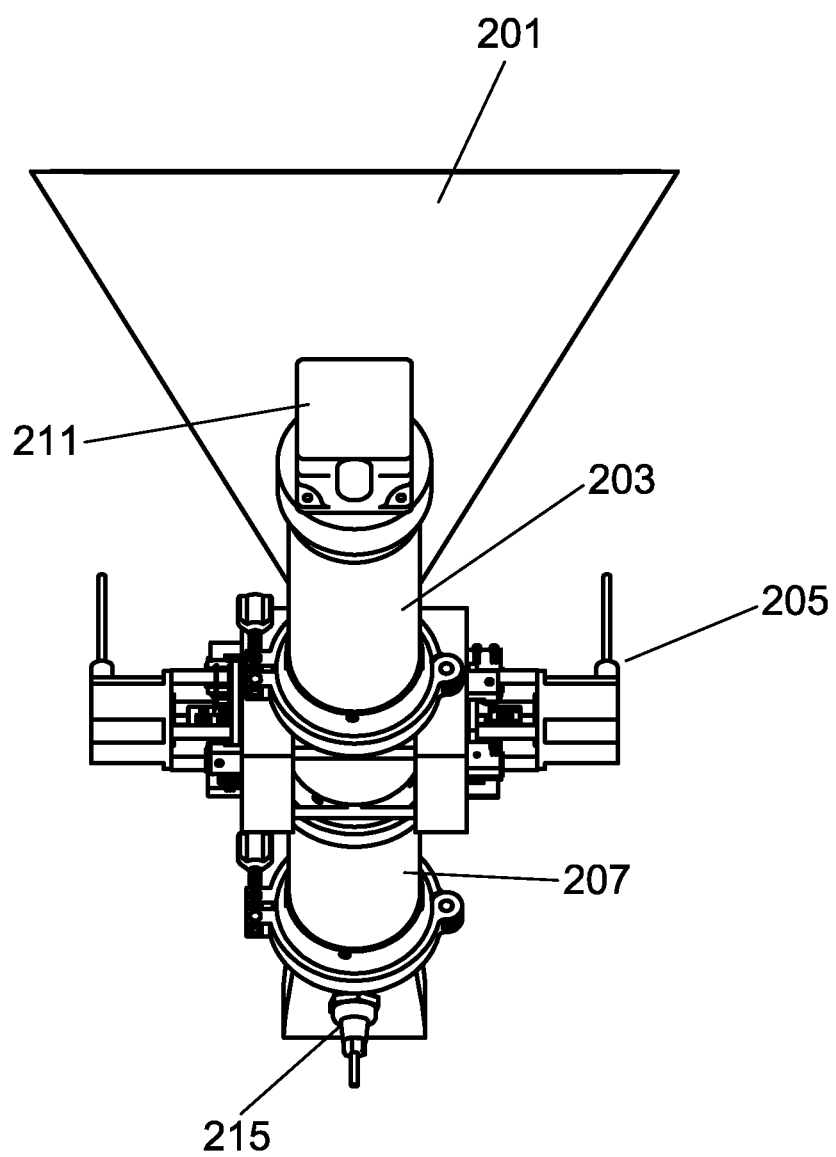
FIG. 10 is a bottom perspective view of the Mortar Delivery System.
Figure 11:
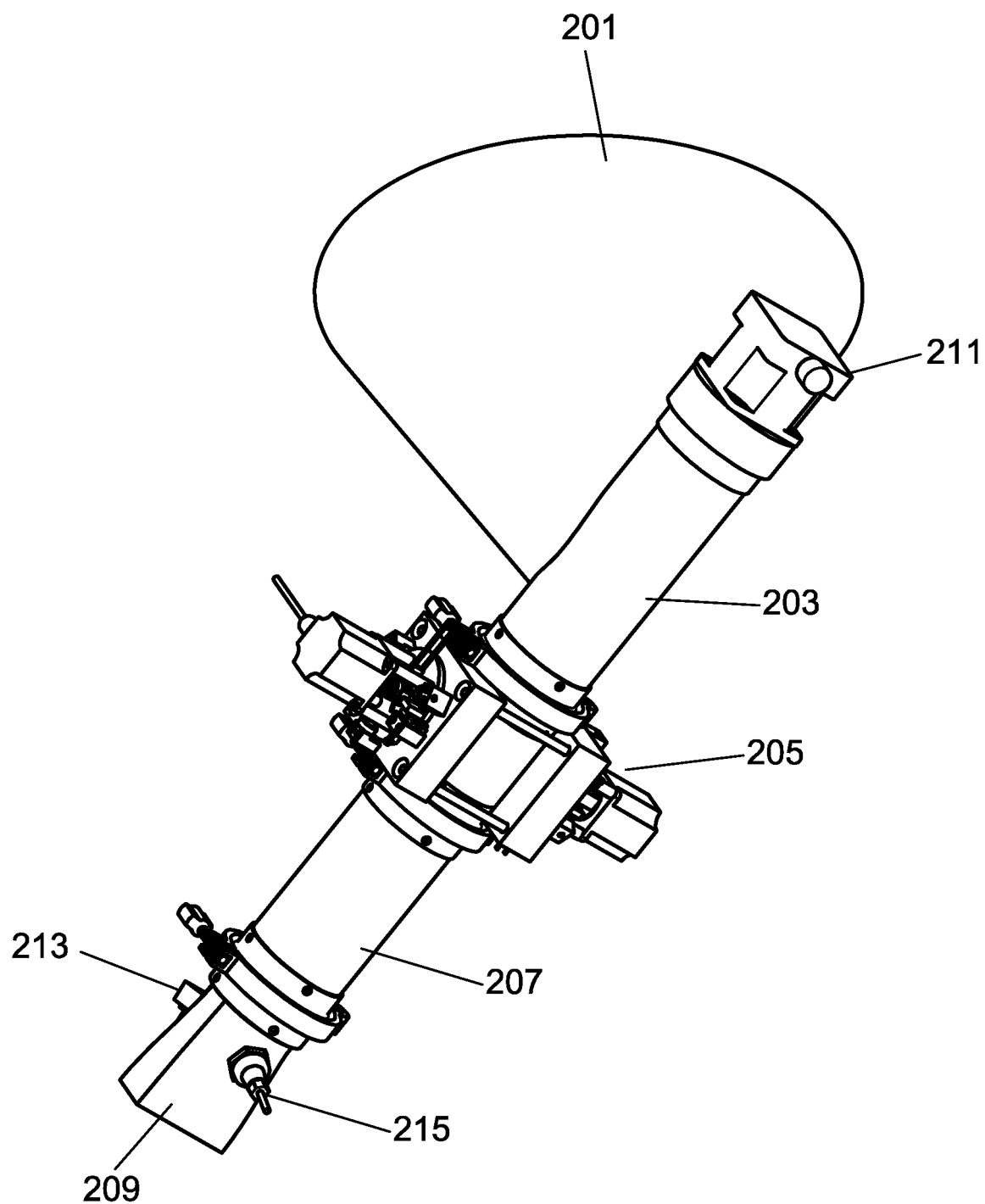
FIG. 11 is a side perspective view of the Mortar Delivery System.

FIG. 6 is a nozzle end perspective view of the Mortar Delivery System of the present invention. FIG. 7 is a cutaway view of the Mortar Delivery System taken along line B-B of FIG. 6 clearly showing the internals of the Mortar Delivery System. FIG. 8 is a top plan view of the Mortar Delivery System showing the first auger 503 exposed to the open bottom of the hopper 201. FIG. 9 is a bottom plan view of the Mortar Delivery System. FIG. 10 is a bottom perspective view of the Mortar Delivery System. FIG. 11 is a side perspective view of the Mortar Delivery System. While mounts for the Mortar Delivery System are not depicted herein, it can be appreciated that a variety of mounts may be employed to retain the Mortar Delivery System to an appropriate stand or structure.

Figure 12:
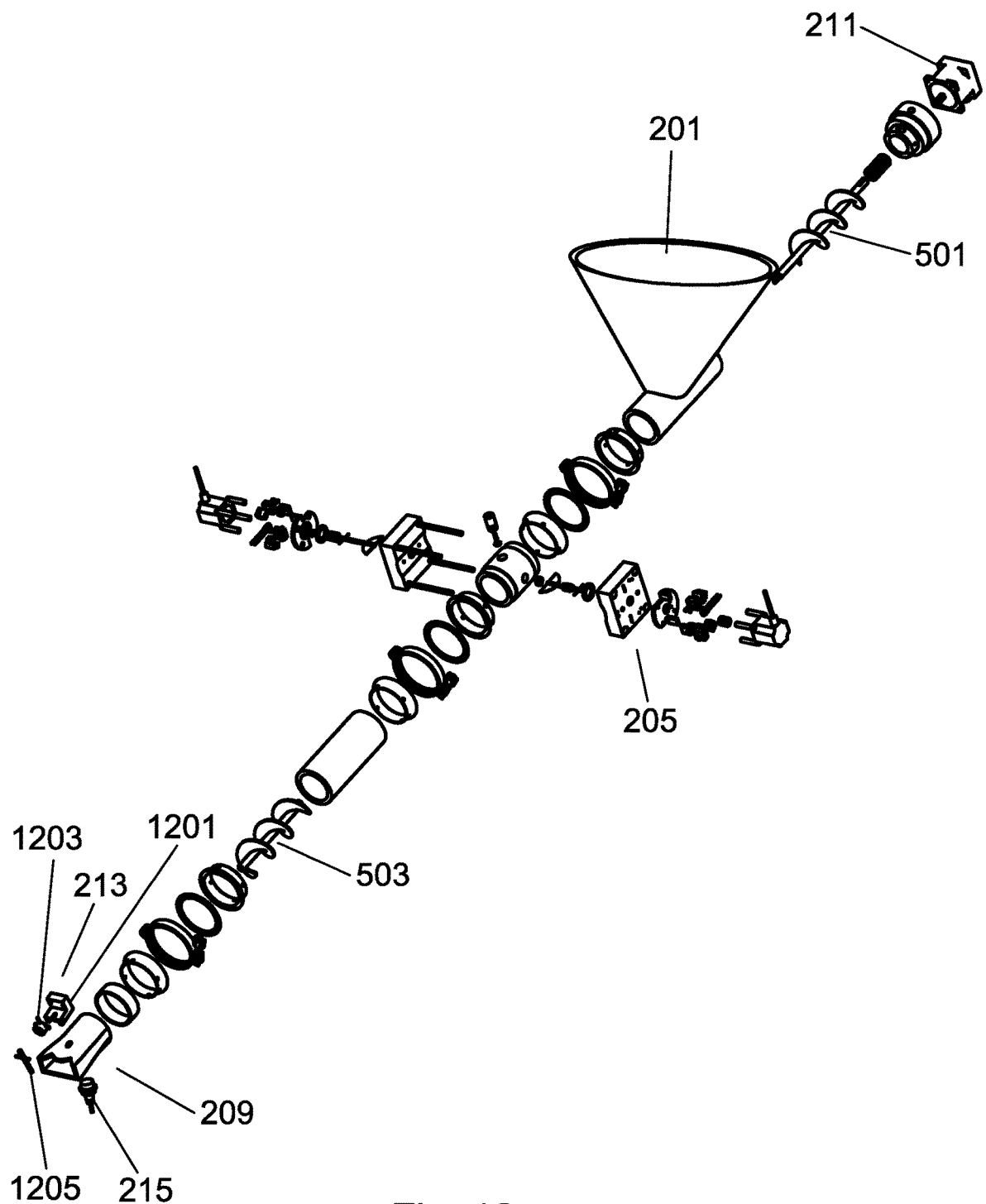
FIG. 12 is an exploded view of the Mortar Delivery System.

FIG. 12 is an exploded view of the Mortar Delivery System. The various components of the Mortar Delivery System can be seen as well as an exploded view of the nozzle 209 and related sensors. The nozzle output pressure sensor 215 can be seen that provides an analog signal that is proportional to nozzle output pressure as mortar is being delivered through the nozzle. The analog signal may be in the form of a voltage that is then provided to the input of an analog to digital converter to create a digital output that can be used by a microcontroller or microprocessor for process control and feedback. A force sensor and pivot arm arrangement is used to measure mortar characteristics such as mortar flow rate and rheology, as well as other physical properties of mortar. The greater the flow rate, the more the pivot arm moves into the force sensor, creating a greater analog output from the force sensor that is then provided to the input of an analog to digital converter to create a digital output that can be used by a microcontroller or microprocessor for process control and feedback. The signal can be correlated to mortar characteristics such as rheology and flow rate. The force sensor and pivot arm arrangement comprises a bracket 1201 that retains a button load cell 1203 and pivotally retains a pivot arm 1205. The pivot arm 1205 protrudes through an opening in the nozzle 209 such that it contacts the flow of mortar through the nozzle.

Figure 13:
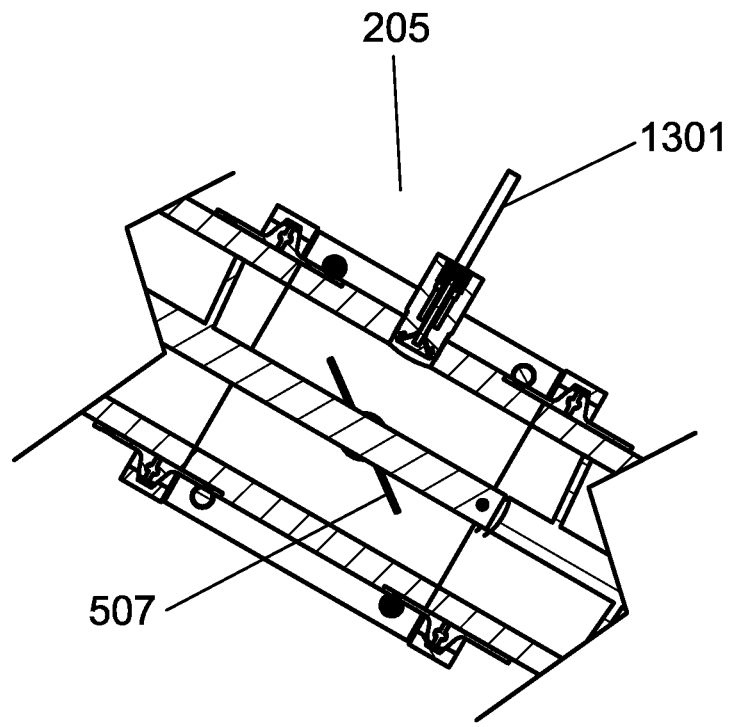
FIG. 13 is a close up cutaway view of the conditioning device as depicted in FIG. 7.
Figure 14:
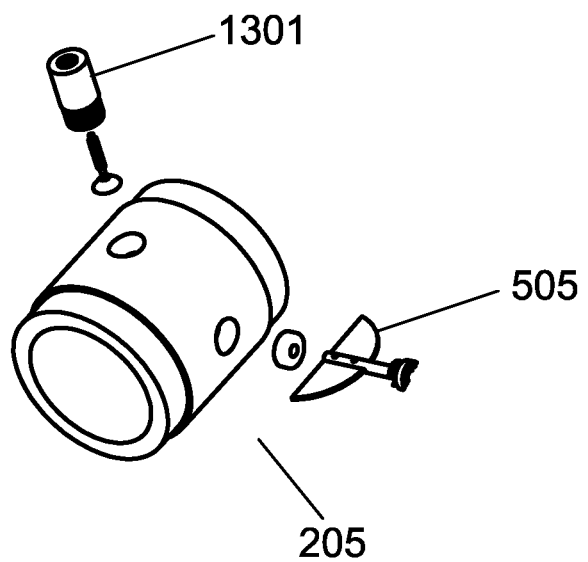
FIG. 14 is an exploded view of the conditioning device housing.

Turning now to FIG. 13, a close up cutaway view of the conditioning device 205 as depicted in FIG. 7 can be seen. The second shear blade 507 can be seen in this view along with a water feed 1301 that comprises a fitting and a valve for injection of water into the conditioning device 205. The water feed 1301 may be a tubular fitting made from a metal such as stainless steel or brass, or a plastic. FIG. 14 is an exploded view of the conditioning device housing that clearly shows the water feed 1301 that is fit to the conditioning device 205 by way of an opening in the conditioning device. The opening may be threaded or otherwise provided with an engaging structure to retain the water feed 1301. The first shear blade 505 can also be seen in exploded view outside the conditioning device 205 along with a shaft for coupling to a motor or similar driving element.

Figure 15:
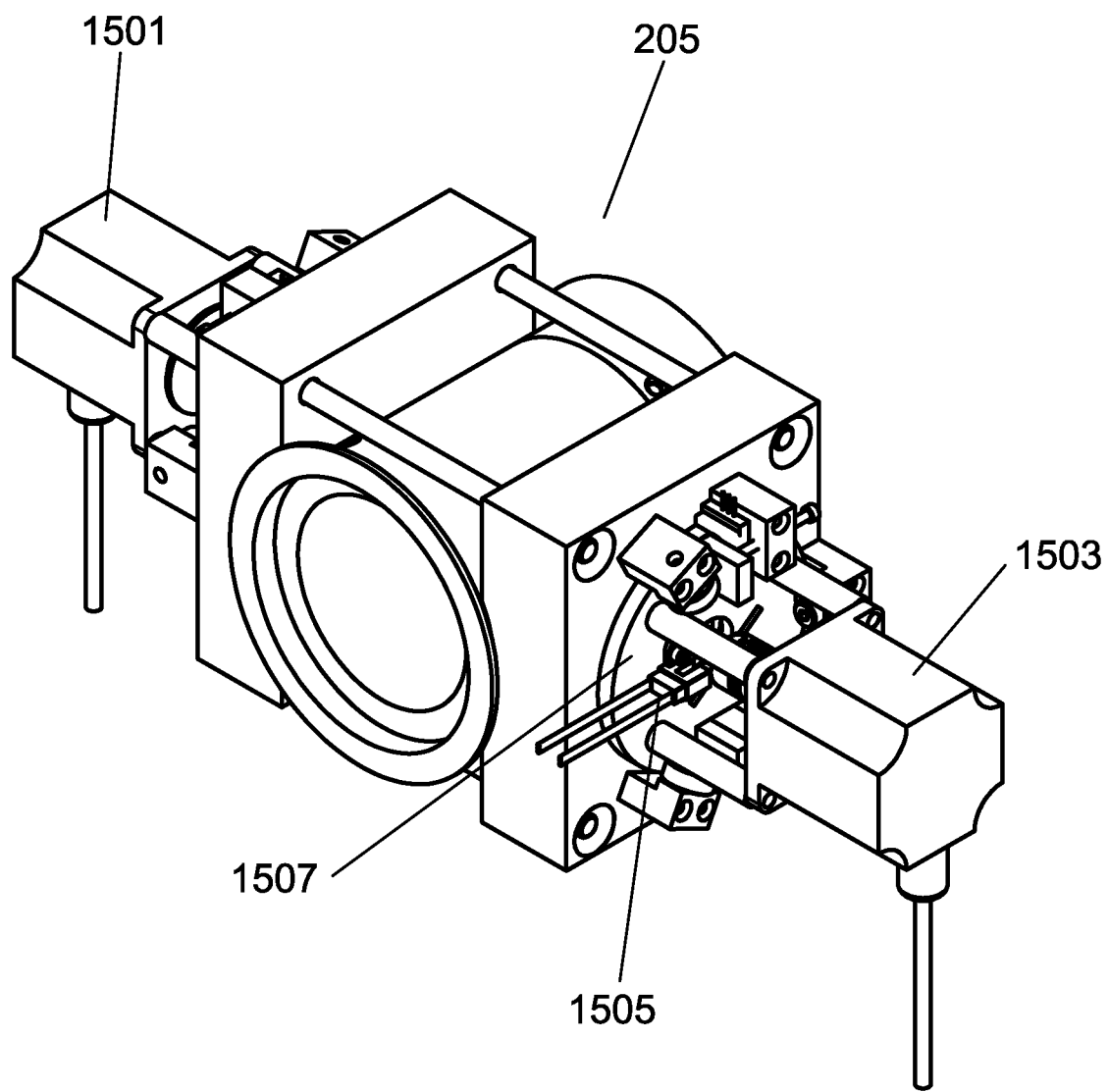
FIG. 15 is a perspective view of the conditioning device.

FIG. 15 is a perspective view of the conditioning device 205 that shows the first motor 1501 and the second motor 1503, both of which are coupled to their respective shear blade (not seen in FIG. 15). Importantly, the rotation of each motor is monitored by way of a sensor 1505 where a key, shaft, rod, or other feature protrudes from the drive shaft of the shear blade in a way in which it impinges on the sensing area of the sensor 1505. The sensor 1505 may be any sensor that detects rotation, such as an optical sensor or a hall effect sensor. A suitable optical sensor is, for example, the Transmissive Optoschmitt Sensor manufactured by Honeywell of Morristown, N.J. Such an optical sensor is an infrared emitting diode facing an optoschmitt detector which includes a photodiode, amplifier, voltage regulator. Schmitt trigger and an NPN output transistor with pull up resistor. In addition, a rotational torque sensor plate 1507 can be seen and will be further described by way of FIG. 17.

Figure 16:
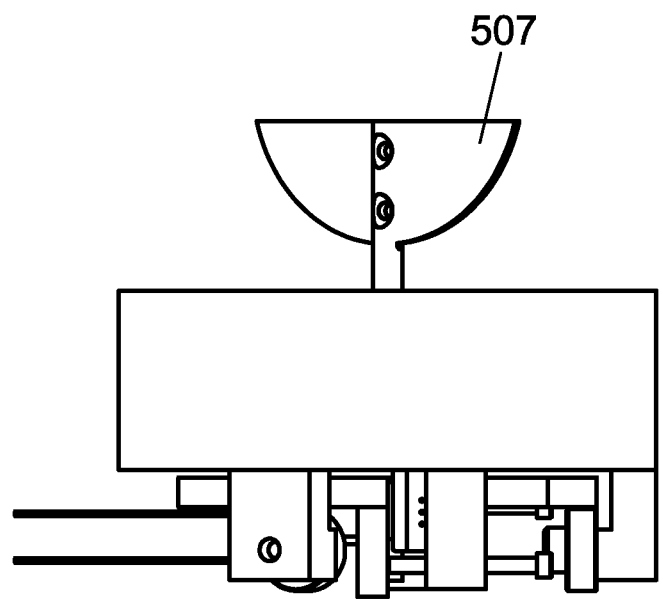
FIG. 16 is a side plan view of the first shear blade and sensor assembly of the conditioning device.

FIG. 16 is a side plan view of the first shear blade and sensor assembly of the conditioning device.

Figure 17:
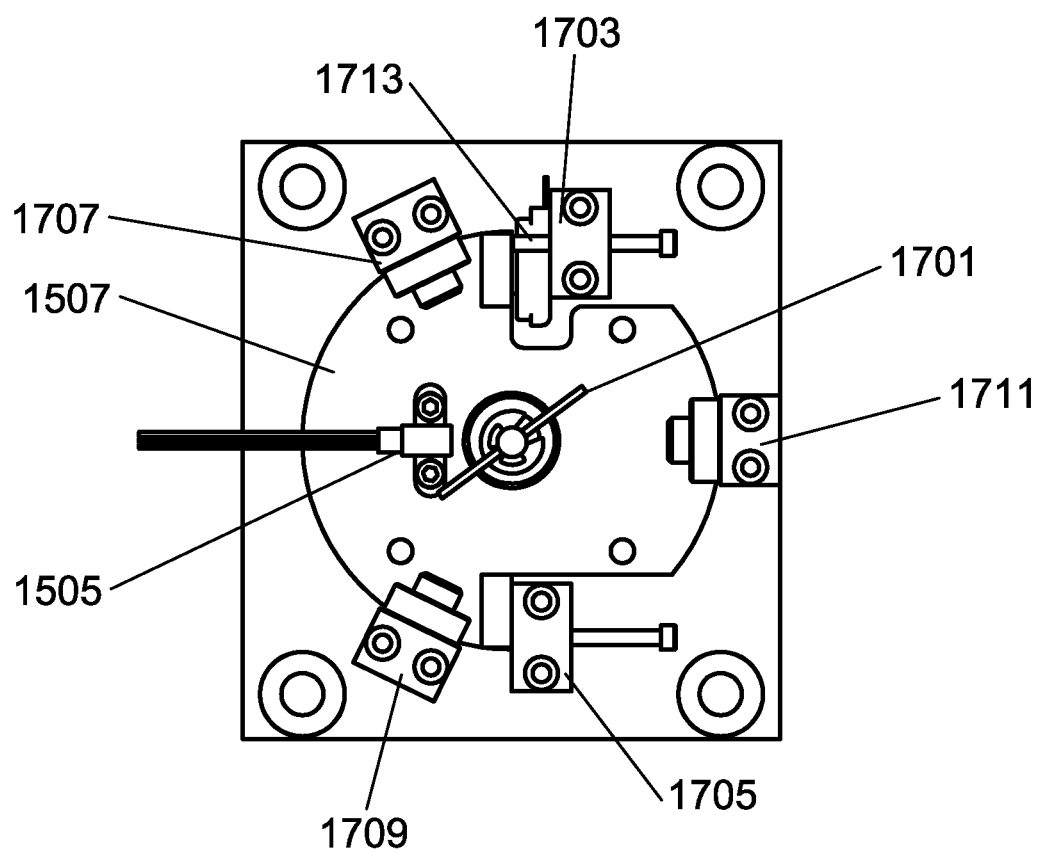
FIG. 17 is a plan view of the first shear blade and sensor assembly of the conditioning device.

FIG. 17 is a plan view of the first shear blade and sensor assembly of the conditioning device that shows the sensor 1505 and a counter key 1701 that is placed through the rotational shaft of the shear blade in order to impinge upon the sensing area of the sensor 1505. The counter key 1701 is a metal rod or shaft that rotates with the rotational shaft of the shear blade, and thus provides a sensing element for the sensor 1505 to generate an output voltage or current whose frequency corresponds to the rotational speed of the rotational shaft of the shear blade. Torque on the motor that drives the shear blade provides an indication of mortar viscosity. Viscosity or workability of mortar is a measure of how stiff the mortar is. The unit of measure varies in the industry but can be expressed as cP (centipoise) and varies with concentration which is often referred to as Mix Ratio (mix ratio of water to mortar mix). Workability can be quantified by measuring the shear force required to move a blade through the mortar. In one embodiment of the present invention, a motor turns a blade through the mortar and a force sensor measures the resulting motor torque, which is then empirically correlated to a cP or equivalent Mix Ratio value. A calibration function equation is then used to convert torque to CPS or Mix Ratio. A motor is attached to the rotational torque sensor plate 1507 and the rotational torque sensor plate 1507 is held by a bearing assembly such as the first bearing assembly 1707, the second bearing assembly 1709 and the third bearing assembly 1711. A counter rotational force is experienced by the torque sensor plate as a result of the shear blade turning in the mortar. This counter rotational force is in turn sensed by the force sensor 1713. The force sensor 1713 is, in one embodiment of the present invention, a button load cell such as the compression load cell manufactured by Measurement Specialties of Fremont, Calif. Such a forcer sensor employs silicon piezoresistive strain gauges fused with high temperature glass. A cutout in the rotational torque sensor plate 1507 pushes on a force sensor 1713 that is retained by a first torque sensor sop 1703. A second torque sensor stop 1705 provides for retention in the opposing direction. Knowing torque and speed of the motor driving the shear blade allows for an understanding of current mortar rheology, and also allows for the adjustment of these mortar characteristics by changing the amount of water being added to the mortar mix, changing the speed at which the mortar is being mixed or delivered, and the like.

Figure 18:
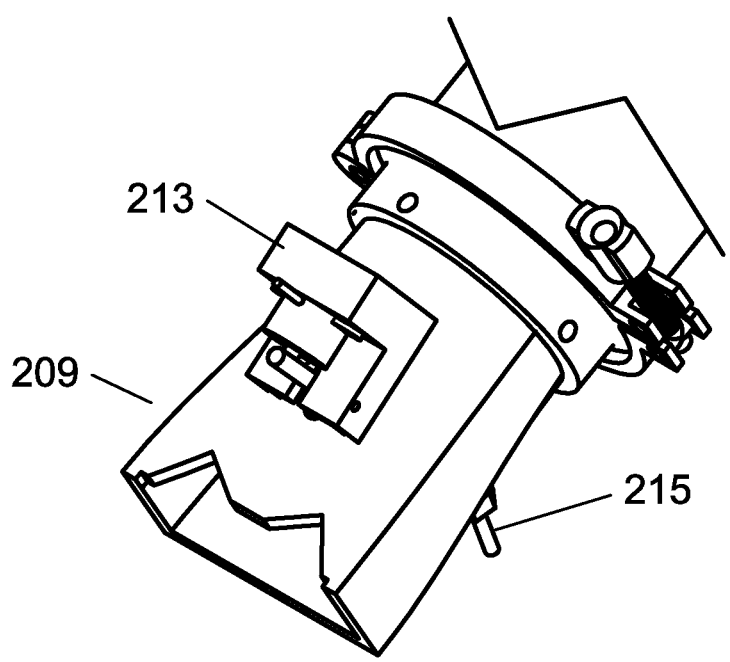
FIG. 18 is a perspective view of the nozzle showing the flow sensor and nozzle output pressure sensor.
Figure 19:
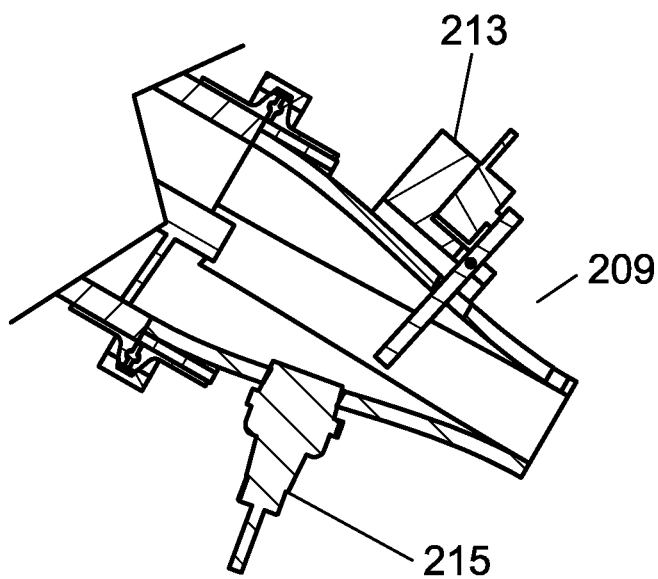
FIG. 19 is a cutaway view of the nozzle as depicted in FIG. 7.
Figure 20:
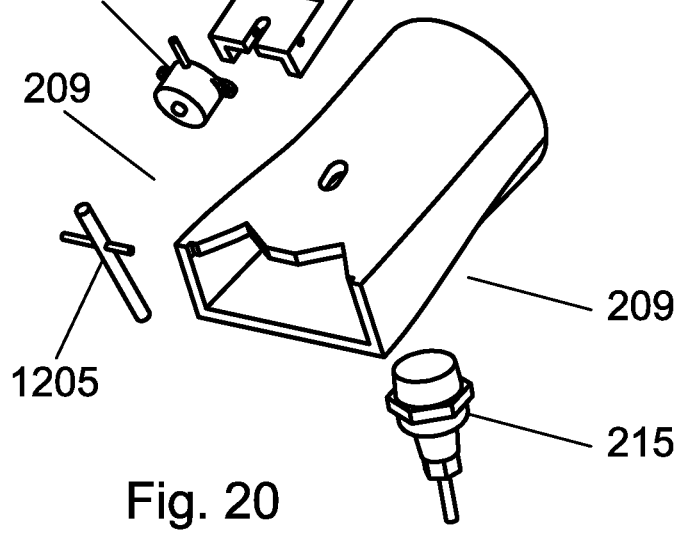
FIG. 20 is an exploded view of the nozzle with sensors.

FIGS. 18-20 depict the nozzle 209 along with sensors to determine pressure at the nozzle output as well as mortar flow. FIG. 18 is a perspective view of the nozzle showing the flow sensor 213 and nozzle output pressure sensor 215. The nozzle output pressure sensor may be contained within the nozzle, or may, in some embodiments of the present invention, be contained in the feed tube. The nozzle and output pressure sensor arrangement is applicable to all of the embodiments of the mortar delivery system described or envisioned herein. The flow sensor having previously been described includes a bracket 1201 as seen in FIG. 12. The bracket as more clearly seen in FIG. 18 has a notch to allow the pivot arm 1205 to move freely without interference from the bracket structure. FIG. 19 is a cutaway view of the nozzle as depicted in FIG. 7 where the pivot ara 1205 can be seen protruding into the nozzle and into the mortar flow path. FIG. 20 is an exploded view of the nozzle with sensors clearly showing the various components thereof. The pivot arm 1205 can be seen with a cross balance protruding through the pivot arm 1205 for retention by the bracket 1201.

It can therefore be seen that in use, the Mortar Delivery System provides for precise mixing and tempering of mortar as well as accurate placement and delivery of mortar to a building element such as a brick, block, or stone. The Mortar Delivery System further delivers mortar that is of the exact characteristics specified by the user, something that heretofore not been possible with traditional mortar mixing and delivery systems. To me the Mortar Delivery System, mortar is placed in the hopper 201 while the drive motor assembly 211 is rotating. The motors of the conditioning device (1501 and 1503) are also rotating and in one embodiment of the present invention water is being fed to the conditioning device through a water feed 1301. In addition, outputs from the flow sensor 213, nozzle output pressure sensor 215, sensor 1505, and force sensor 1713 are received by a microcontroller, microprocessor or the like. Process adjustments based on this sensor data are made in the form of motor rotational velocity, water flow to the conditioning device, and the like. A building element such as a brick, block or stone is placed under the nozzle 209 where mortar is dispensed to the building element in a manner that is appropriate for the building application. For example, mortar thickness and pattern of mortar application can vary depending on the building element and building application. The process of mortar mixing, adjustment, and application is repeated for each building element until construction work is halted.

Figure 21:
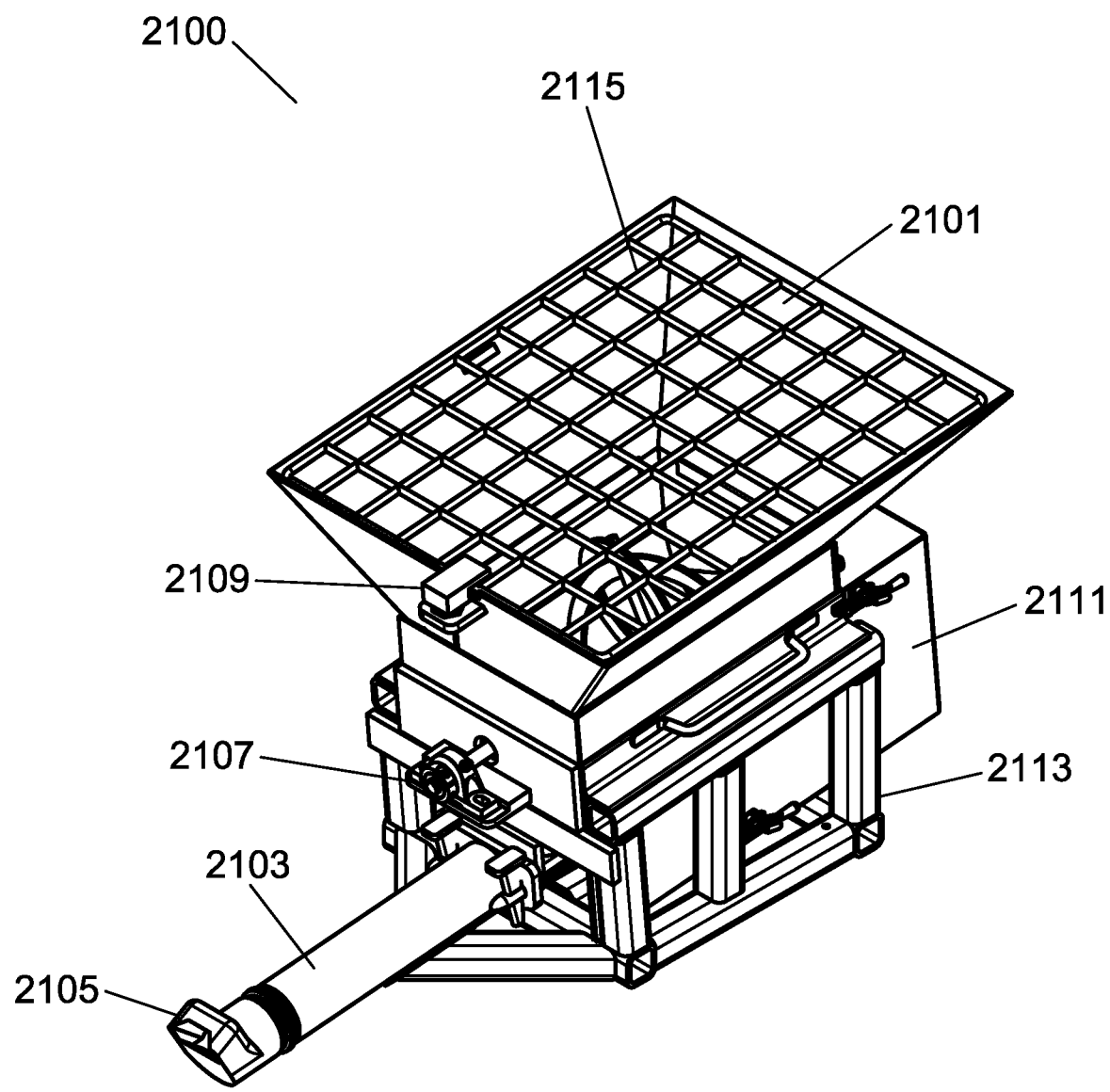
FIG. 21 is a perspective view of a second embodiment of the mortar delivery system.

Turning now to FIGS. 21-27, a second embodiment of the mortar delivery system of the present invention 2100 is depicted. Many of the components are common with the first embodiment of the present invention that has been previously described herein. FIG. 21 shows a perspective view where a hopper 2101 passes the mortar through augers that will be seen in more detail in FIG. 25. A feed tube 2103 passes the mortar to a nozzle 2105 where the robotic arm assembly of the brick laying system passes a brick or similar construction element across the nozzle 2105 where mortar is dispensed thereon. The angled orientation of the feed tube 2103 can be seen. Such an angle can vary from zero degrees to 90 degrees, with an example in one embodiment of the present invention being 15-45 degrees. The purpose of the angled orientation is to allow gravity to assist in the flow of mortar or mortar mix in the feed tubes. The various elements of the Mortar Delivery System may also contain quick release fixtures to facilitate cleaning and maintenance.

Figure 22:
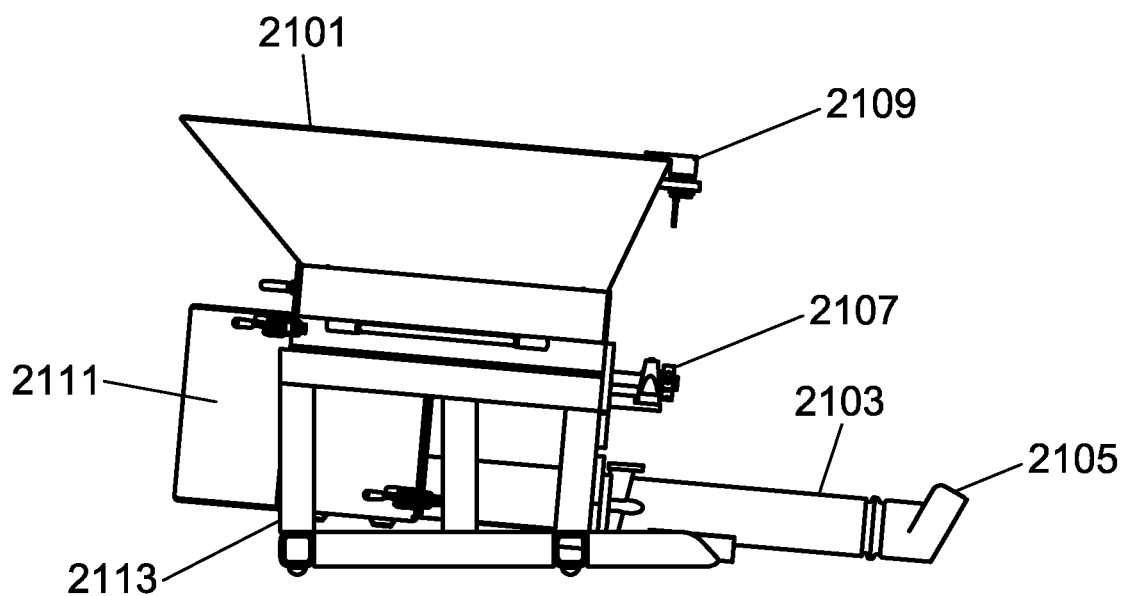
FIG. 22 is a side view of the mortar delivery system of FIG. 21.
Figure 23:
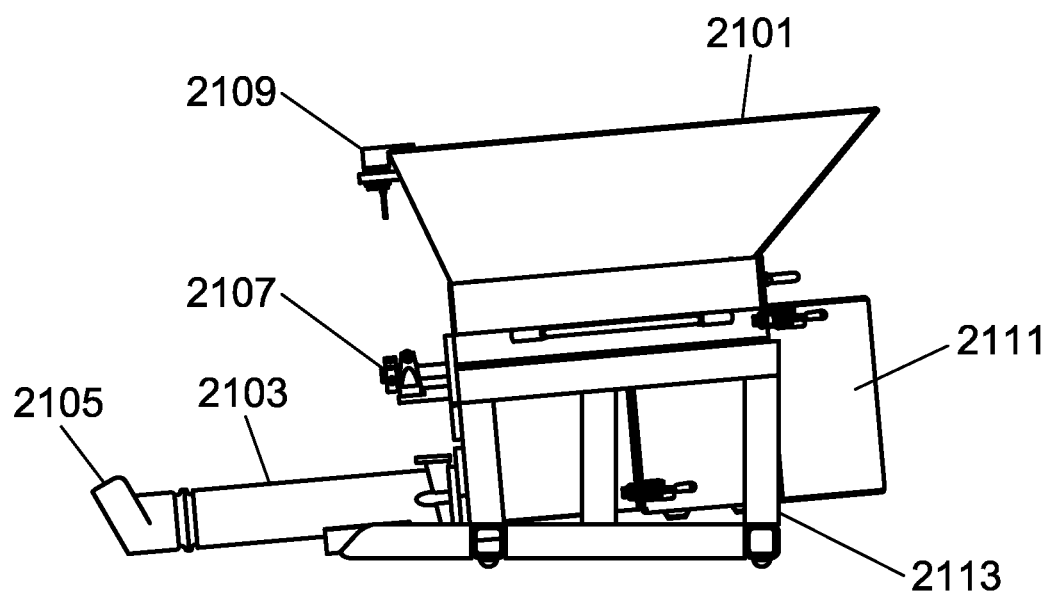
FIG. 23 is an alternate side view of the mortar delivery system of FIG. 21.
Figure 24:
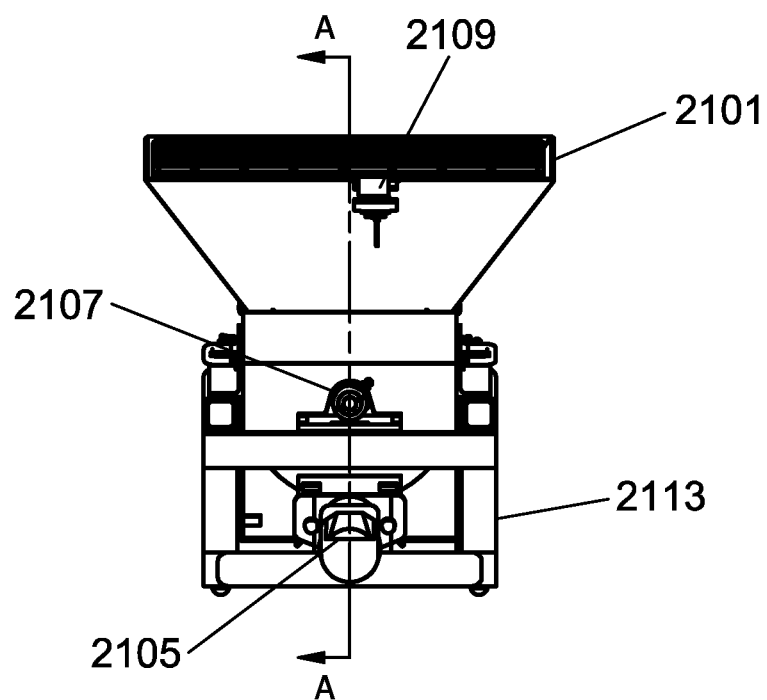
FIG. 24 is a frontal view of the mortar delivery system of FIG. 21.
Figure 25:
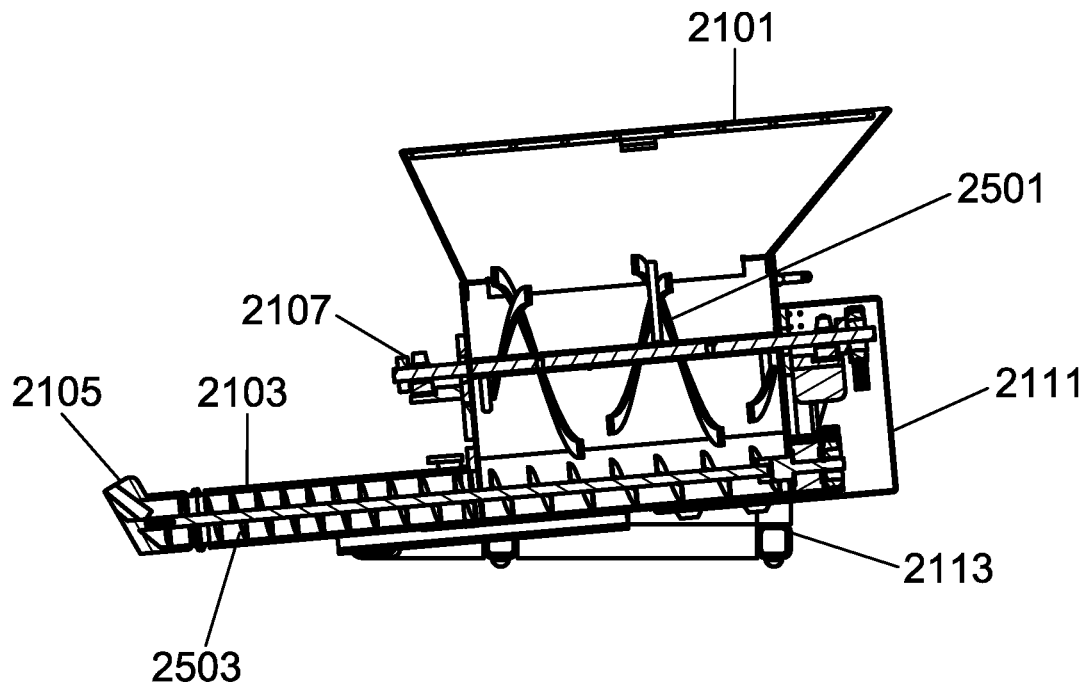
FIG. 25 is a cutaway view of the mortar delivery system of FIG. 21 taken along line A-A of FIG. 24.

Also seen in FIG. 21 is a shaft end bearing assembly 2107 that retains the shaft and auger arrangement contained within the mortar delivery system of the present invention. A sensor 2109 ensures that the safety grating 2115 is in proper position. A stand 2113 supports the mortar delivery system and may, in some embodiments of the present invention, have wheels, casters, skids, tow hooks or the like. FIG. 22 depicts a side view of the mortar delivery system of FIG. 21. FIG. 23 is an alternate side view of the mortar delivery system of FIG. 21. FIG. 24 is a frontal view of the mortar delivery system of FIG. 21. FIG. 25 is a cutaway view of the mortar delivery system of FIG. 21 taken along line A-A of FIG. 24. A mixing structure 2501 can be seen coupled to a shaft that is in turn rotated by a motor such as an electric motor or Internal combustion engine.

Figure 26:
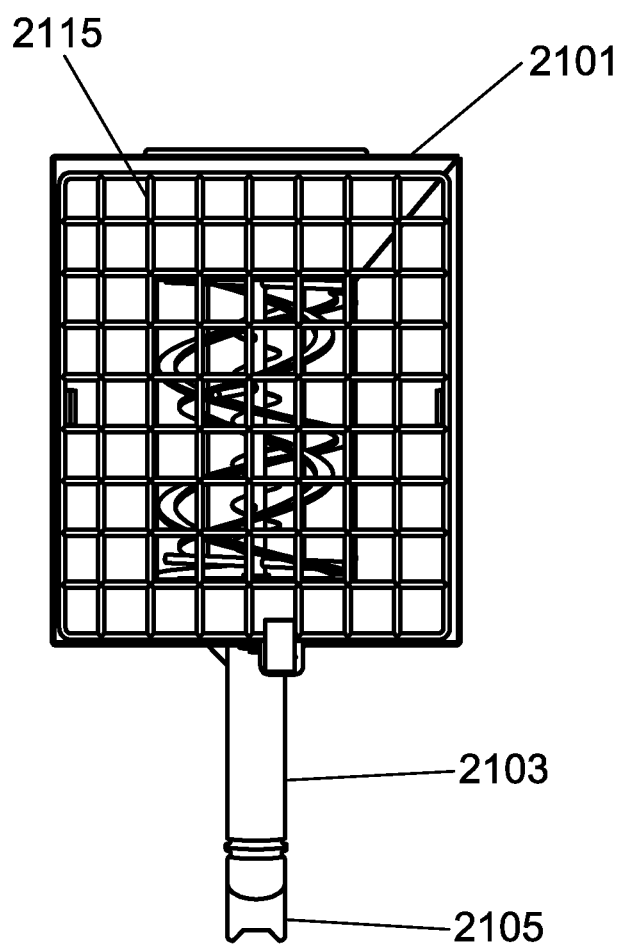
FIG. 26 is a top plan view of the mortar delivery system of FIG. 21.
Figure 27:
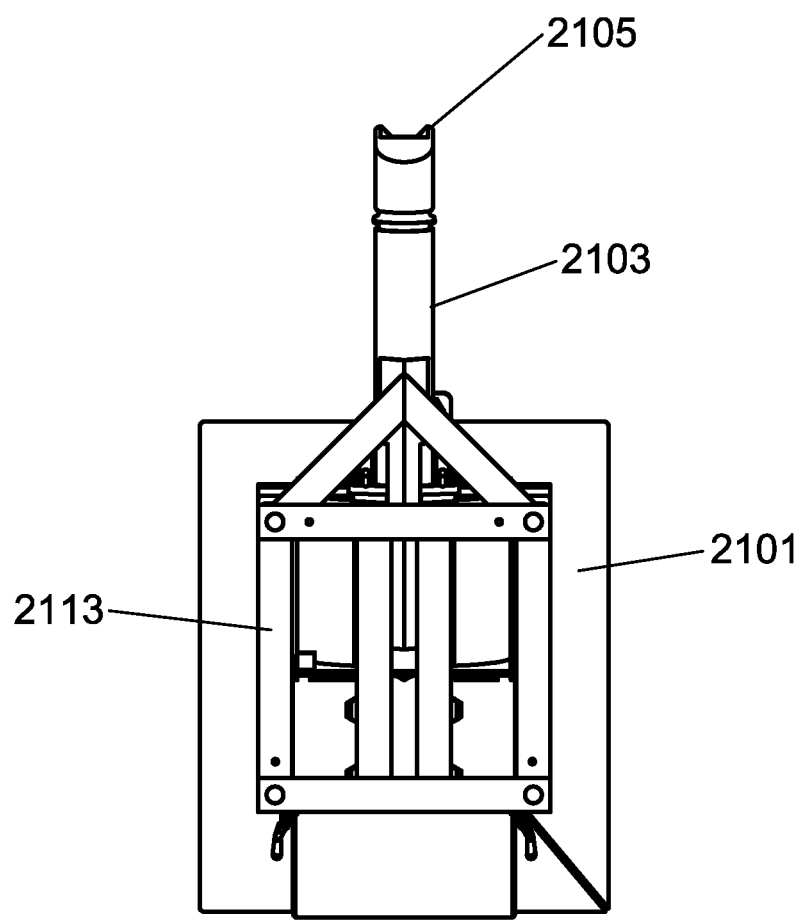
FIG. 27 is a bottom plan view of the mortar delivery system of FIG. 21.

As the mortar is mixed, a feed auger 2503 moves the mortar along the feed tube 2103 and out the nozzle 2105. In some embodiments of the present invention, the feed auger 2503 is a variable pitch auger having multiple zones, for example, two or three zones. FIG. 26 is a top plan view of the mortar delivery system of FIG. 21 and FIG. 27 is a bottom plan view of the mortar delivery system of FIG. 21. Sensors and various elements of the first embodiment of the mortar delivery system may be employed in this second embodiment of the mortar delivery system. For example, a force sensor to measure mortar characteristics such as mortar flow rate and rheology, as well as other physical properties of mortar. Characteristics such as flow rate and mortar rheology may be employed in communication with the mixing structure or the feed auger. With the feed auger, for example, the force sensor acts by measuring electrical current flow to the second source of rotational energy (which is coupled to the feed auger). The greater the current flow into the second source of rotational energy (in this case an electric motor), the more torque (or force) that is being applied to the mortar by the feed auger, and therefore the stiffer the mortar rheology. Rotational speed of the augers is used to precisely control mortar delivery. Rotational sensors such as encoders are employed and are in communication with the feed auger and the mixing structure (first auger and second auger) to provide rotational speed data that is then used for precise mixing, tempering and delivering of mortar by way of a computer based method, as further described herein.

The mortar delivery system depicted in FIGS. 21-27 comprises a hopper in material communication with a mixing structure; feed auger in material communication with the mixing structure; a feed tube containing the feed auger; a nozzle coupled to the feed tube for forming a mortar bed; a first source of rotational energy mechanically coupled to the mixing structure; a second source of rotational energy mechanically coupled to the feed auger; and a force sensor to measure mortar characteristics such as mortar flow rate and rheology, as well as other physical properties of mortar. In some embodiments of the present invention, the first source of rotational energy and the second source of rotational energy are the same. In some embodiments of the present invention, rotational energy is provided by an electric motor.

Figure 28:
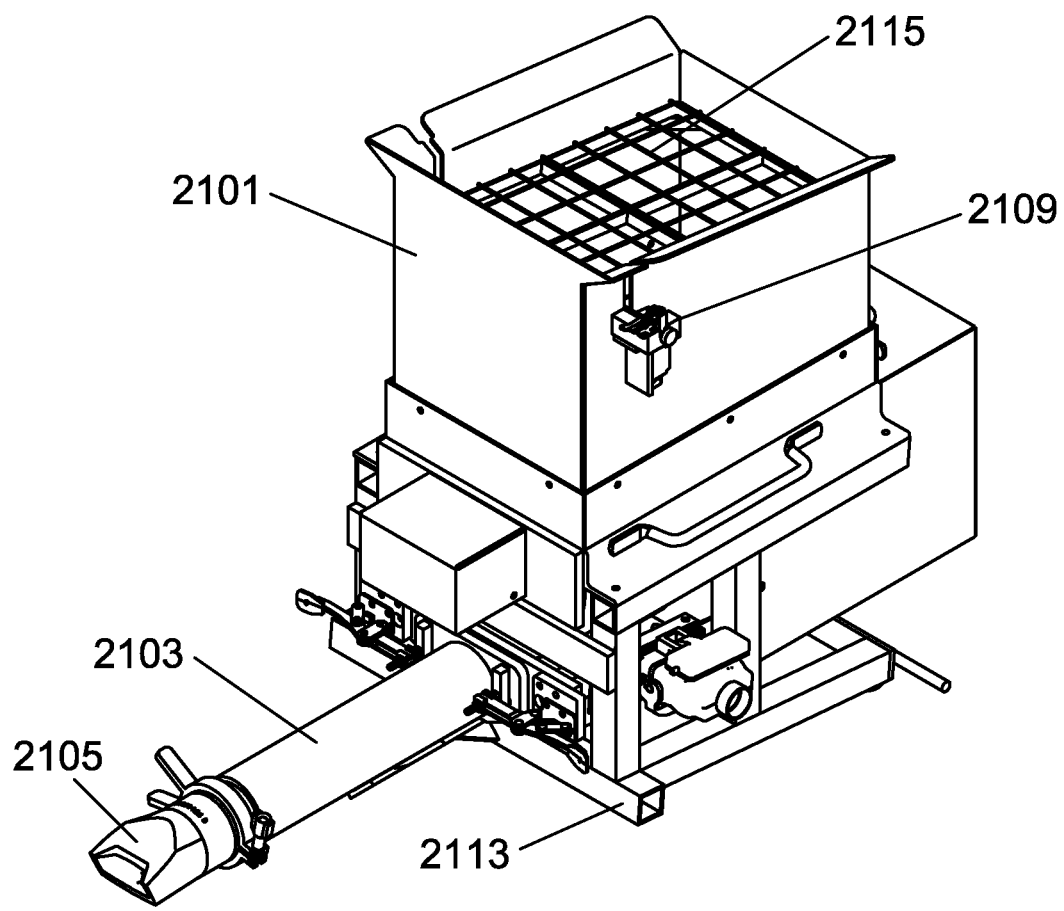
FIG. 28 is a perspective view of a third embodiment of the mortar delivery system.

FIG. 28 is a perspective view of a third embodiment of the mortar delivery system. In this embodiment, the hopper has vertical walls. Other embodiments may have walls of varying pitch to facilitate mortar, mortar mix, or mortar component entry into the mortar delivery system.

Figure 29:
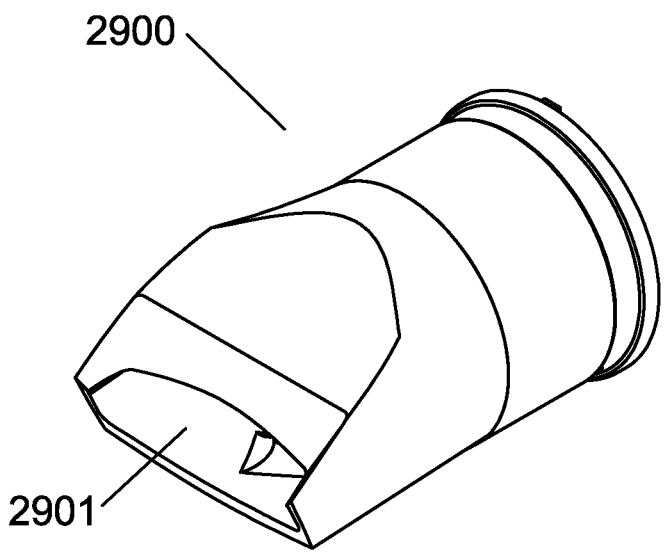
FIG. 29 is a perspective view of a bifurcation nozzle.
Figure 30:
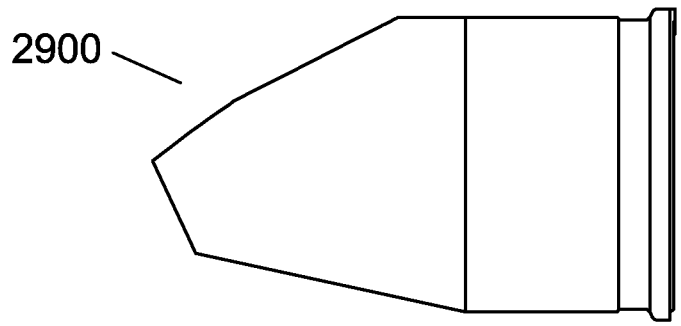
FIG. 30 is a side plan view of the bifurcation nozzle of FIG. 29.
Figure 31:
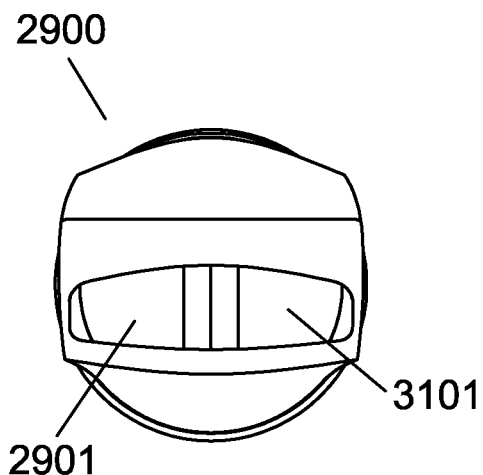
FIG. 31 is a discharge side plan view of the bifurcation nozzle of FIG. 29.
Figure 32:
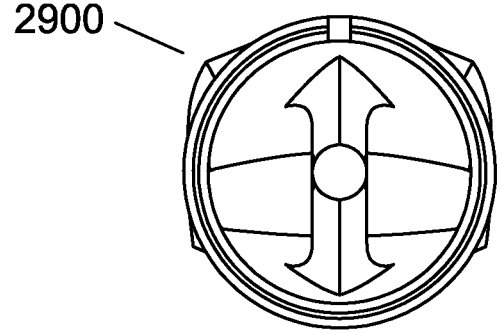
FIG. 32 is a feed side plan view of the bifurcation nozzle of FIG. 29.

The shape of the applied mortar bed by the mortar delivery system is important in many applications. Various nozzles have heretofore been described. In addition, the ability to create more than one mortar bead has benefits, in particular when the mortar delivery system is used with an automated or semi-automated brick laying system. Provided herein are several examples of nozzles that create a two bead mortar bed. FIG. 29 is a perspective view of a bifurcation nozzle where a bifurcation element 3101 as seen in FIG. 31 is located within the nozzle to split the outgoing mortar stream into two parts. The nozzle aperture 2901 is seen as having an open area along an angled face of the nozzle. The bifurcation element 3101 may, in some embodiments of the present invention, have a pointed or tapered leading or trailing edge to facilitate splitting the mortar stream. FIG. 30 is a side plan view of the bifurcation nozzle of FIG. 29 showing the angled face to allow for case of building element mortar application. FIG. 31 is a discharge side plan view of the bifurcation nozzle of FIG. 29 showing the bifurcation element 3101 within the nozzle aperture 2901. FIG. 32 is a feed side plan view of the bifurcation nozzle of FIG. 29 again showing the bifurcation element in the aperture.

Figure 33:
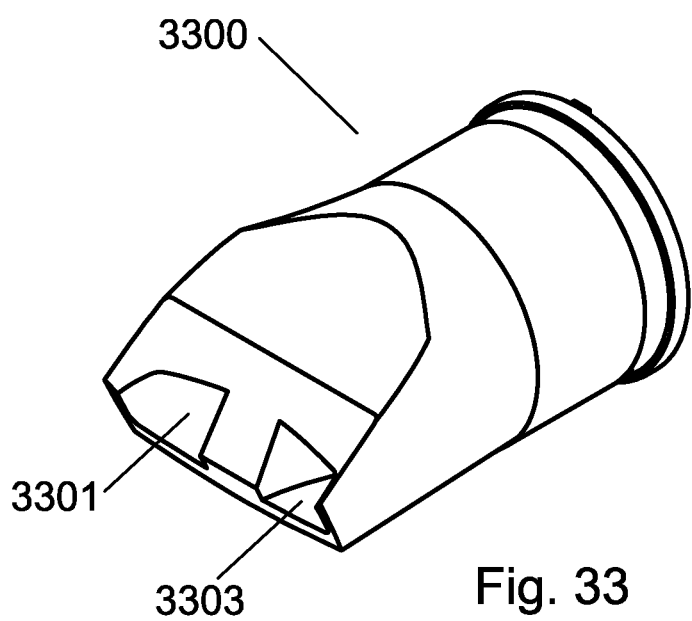
FIG. 33 is a perspective view of a dual aperture nozzle.
Figure 34:
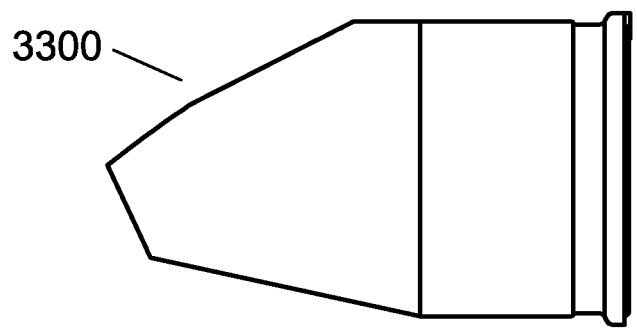
FIG. 34 is a side plan view of the dual aperture nozzle of FIG. 33.
Figure 35:
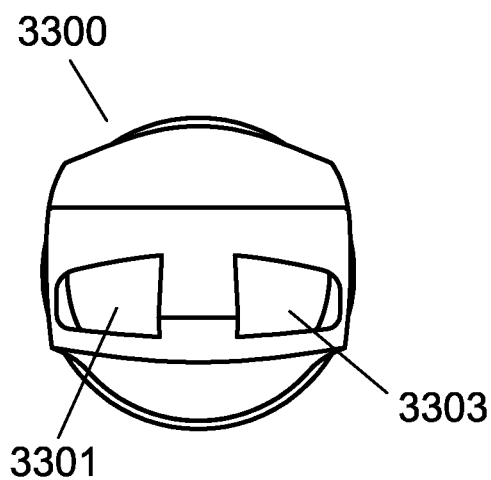
FIG. 35 is a discharge side plan view of the dual aperture nozzle of FIG. 33.
Figure 36:
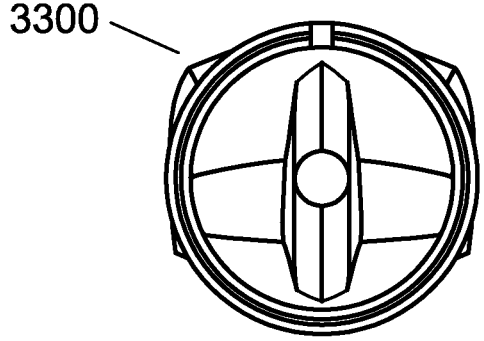
FIG. 36 is a feed side plan view of the dual aperture nozzle of FIG. 33.

FIG. 33 is a perspective view of a dual aperture nozzle where a first aperture 3301 and a second aperture 3303 can be seen. Again, the nozzle has an angled face as also seen in the previous embodiment of FIG. 29. FIG. 34 is a side plan view of the dual aperture nozzle of FIG. 33. FIG. 35 is a discharge side plan view of the dual aperture nozzle of FIG. 33. FIG. 36 is a feed side plan view of the dual aperture nozzle of FIG. 33 again showing the dual aperture arrangement. The multiple apertures depicted herein provide a mortar manifold of sorts, directing one mortar stream into multiple mortar streams while the mortar delivery system is in use. The nozzle is in effect partitioned into multiple apertures. More than two apertures may also be partitioned in some embodiments of the present invention.

Figure 37:
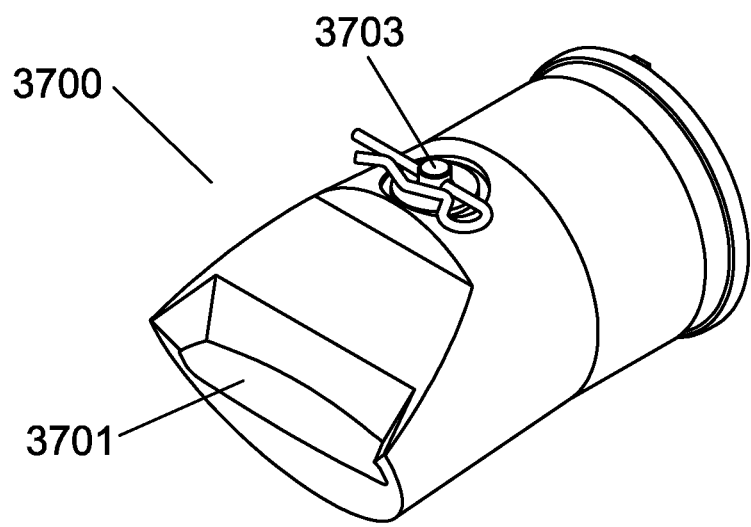
FIG. 37 is a perspective view of a removable bifurcation element nozzle.
Figure 38:
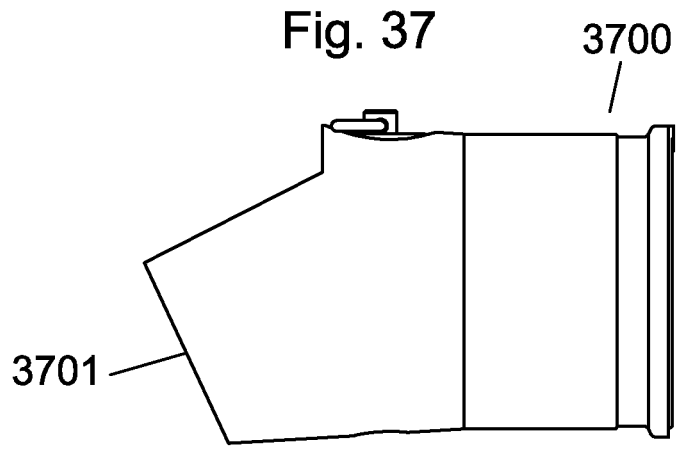
FIG. 38 is a side plan view of the removable bifurcation element nozzle of FIG. 37.
Figure 39:
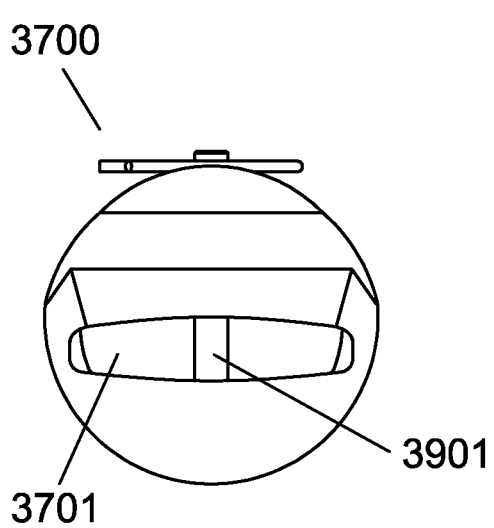
FIG. 39 is a discharge side plan view of the removable bifurcation element nozzle of FIG. 37.
Figure 40:
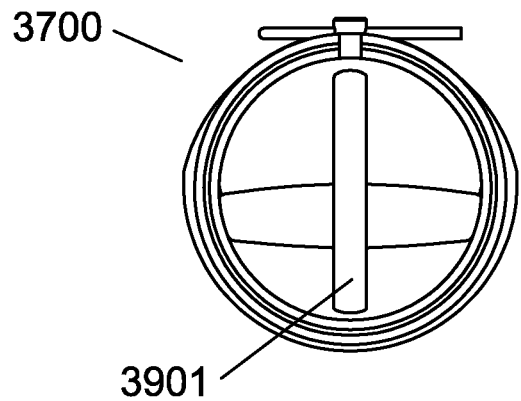
FIG. 40 is a feed side plan view of the removable bifurcation element nozzle of FIG. 37.

FIG. 37 is a perspective view of a removable bifurcation element nozzle where a removable bifurcation element 3901 as seen in FIG. 39, such as a pin or diverter structure is provided in the aperture 3701. A removable bifurcation element retainer 3703 such as a pin, clip, or the like, can be seen in FIG. 37 holding the removable bifurcation element 3901 in place. Removal of the retainer 3703 allows the removable bifurcation element 3901 to be removed for cleaning or for applications where a bifurcated mortar stream is not needed. FIG. 38 is a side plan view of the removable bifurcation element nozzle of FIG. 37. FIG. 39 is a discharge side plan view of the removable bifurcation element nozzle of FIG. 37. FIG. 40 is a feed side plan view of the removable bifurcation element nozzle of FIG. 37.

The mortar nozzles are attached to the feed tube with a band, clip, pins, coupling, or the like, and may be disassembled from the feed tube for cleaning and storage.

To use the mortar delivery system, mortar, mortar mix, mortar elements or related additives are placed in the hopper while the augers are turning. Sensing of the torque being applied by the augers is sent to a microcontroller, a computer, or the like, and the rotational speed of the augers are adjusted based on the applied torque, which correlates to mortar rheology. In applications such as automated or semi-automated brick laying, the precise mixing and tempering of mortar and the accurate delivery of mortar to a building element such as a brick is of paramount importance. The mortar delivery system of the present invention provides such a device. The steps to precisely mix and temper mortar and accurately deliver mortar to a building element using the mortar delivery system of the present invention may be resident on a computer having a processor and memory. The steps may include, but are not limited to, controlling the rotation of a mixing structure in a mortar delivery system; controlling the rotation of a feed auger in the mortar delivery system; sensing the applied torque of the feed auger; correlating the applied torque of the feed auger with mortar rheology; and delivering a specified amount of mortar to a building element by adjusting the rotation of the feed auger based on the applied torque of the feed auger and the desired mortar rheology. In some embodiments of the present invention, the method may include the step of moving a building element while the mortar delivery system delivers a specified amount of mortar onto the moving building element. Movement of the building element may be accomplished by use of a robotic brick laying system having a robotic arm for grasping the building element, for example. Other methods to apply mortar using the mortar delivery system include, for example, moving the mortar nozzle in reference to a building element or building elements.

It is, therefore, apparent that there has been provided, in accordance with the various objects of the present invention, a Mortar Delivery System.

While the various objects of this invention have been described in conjunction with preferred embodiments thereof, it is evident that many alternatives, modifications and variations will be apparent to those skilled in the art. Accordingly, it is intended to embrace all such alternatives, modifications and variations that fall within the spirit and broad scope of this specification, claims and drawings appended herein.

What is claimed is:

1. A mortar delivery system comprising:
a hopper in material communication with a mixing structure;
a feed auger in material communication with the mixing structure;
the mixing structure located in an upper area of the hopper and the feed auger located in a lower area of the hopper;
a feed tube containing the feed auger;
a first source of rotational energy mechanically coupled to the mixing structure;
a second source of rotational energy mechanically coupled to the feed auger;
a force sensor for measuring force applied to the feed auger and for providing analog value; and
a microcontroller configured to receive the analog value and configured to provide a mortar rheology value.

2. The mortar delivery system of claim 1, further comprising a nozzle coupled to the feed tube for forming a mortar bed.

3. The mortar delivery system of claim 1, further comprising a display to indicate the mortar rheology value.

4. The mortar delivery system of claim 1, wherein the source of rotational energy is an electric motor.

5. The mortar delivery system of claim 3, wherein the force sensor measures electrical current flow to the source of rotational energy.

6. The mortar delivery system of claim 1, wherein the feed auger is a variable pitch auger having two zones.

7. The mortar delivery system of claim 1, wherein the fed auger is a variable pitch auger having three zones.

8. The mortar delivery, system of claim 1, further comprising a nozzle output pressure sensor contained within the feed tube.

9. The mortar delivery system of claim 2, further comprising a nozzle output pressure sensor contained within the nozzle.

10. The mortar delivery system of claim 1, wherein the feed tube is angled.

11. The mortar delivery system of claim 1, further comprising a rotational sensor in communication with the mixing structure.

12. The mortar delivery system of claim 1, further comprising a rotational sensor in communication with the feed auger.

13. The mortar delivery system of claim 2, wherein the nozzle is split into two mortar apertures.

14. The mortar delivery system of claim 2, wherein the nozzle is partitioned.

15. The mortar delivery system of claim 2, wherein the nozzle has an adhesion enhancing profile.

16. A mortar delivery system comprising:
a feed zone comprising a hopper:
a conditioning zone comprising a conditioning device having a shear blade in material communication with the feed zone;
a motor fix driving the shear blade;
a force sensor for measuring force applied to a feed auger and for providing an analog value:
a microcontroller configured to receive the analog value and configured to provide a mortar rheology value; and
a metering zone comprising a feed tube containing the feed auger; wherein
the metering zone is in material communication with the conditioning zone.

17. The mortar delivery system of claim 16, further comprising a nozzle coupled to the feed tube for forming a mortar bed.

18. The mortar delivery system of claim 16, wherein the shear blade is attached to a mixing structure.

19. The mortar deliver system of claim 17, wherein the nozzle is split into two mortar apertures.

20. A method of precise mixing and tempering of mortar and accurate delivery of mortar to a building element with the mortar delivery system of claim 1, the method comprising the steps of:
controlling the rotation of the mixing structure in the mortar delivery system;
controlling the rotation of the feed auger in the mortar delivery system;
sensing the applied torque of a rotating shaft in rotational communication with the mortar;
correlating the applied torque of the rotating shaft with mortar rheology;
adjusting mortar rheology based on a specified mortar rheology and an actual mortar rheology; and delivering a specified amount of mortar to a building element by adjusting the rotation of the feed auger.

21. The method of claim 20, further comprising the step of moving a building element while the mortar delivery system delivers a specified amount of mortar onto the moving building element.

22. The method of claim 18, wherein the building element is a brick.

* * * * *

UNITED STATES PATENT AND TRADEMARK OFFICE
CERTIFICATE OF CORRECTION

PATENT NO.         : 10,759,087 B2
APPLICATION NO.    : 15/308358
DATED              : September 1, 2020
INVENTOR(S)        : Peters et al.

Page 1 of 1

It is certified that error appears in the above-identified patent and that said Letters Patent is hereby corrected as shown below:

In the Claims

Column 11, Line 62, Claim 1, 'for providing analog value' should read -for providing an analog value-.

Column 12, Line 38, Claim 16, 'a motor fix' should read -a motor for-.

Signed and Sealed this
Fifth Day of April, 2022

Drew Hirshfeld
*Performing the Functions and Duties of the
Under Secretary of Commerce for Intellectual Property and
Director of the United States Patent and Trademark Office*